(12) United States Patent
Nishida et al.

(10) Patent No.: US 6,212,236 B1
(45) Date of Patent: Apr. 3, 2001

(54) IMAGE DECODING APPARATUS

(75) Inventors: Hideshi Nishida; Kozo Kimura, both of Osaka; Makoto Hirai, Suita; Tokuzo Kiyohara, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/048,190

(22) Filed: Mar. 25, 1998

(30) Foreign Application Priority Data

Mar. 26, 1997 (JP) .................................................. 9-074043

(51) Int. Cl.[7] .................................................. H04N 7/12
(52) U.S. Cl. .................. 375/240.12; 375/240.12
(58) Field of Search .................. 348/406, 409; 375/240; 358/430; 369/32

(56) References Cited

U.S. PATENT DOCUMENTS

| | | | |
|---|---|---|---|
| 4,028,731 | * 6/1977 | Arps et al. ............................. | 358/430 |
| 4,302,775 | * 11/1981 | Widergren et al. ................... | 348/406 |
| 5,537,440 | 7/1996 | Eyuboglu et al. .................... | 375/245 |
| 5,623,459 | * 4/1997 | Iwamura et al. ...................... | 369/32 |
| 5,703,697 | 12/1997 | Normile ............................... | 358/433 |

FOREIGN PATENT DOCUMENTS 8154247   11/1996   (JP) .

OTHER PUBLICATIONS

"A 66–MHz DSP–Augmented RAMDAC for Smooth–Shaded Graphic Applications," by J. Leonard et al.. IEEE Journal of Solid–State Circuits, 26 (1991) Mar., No. 4.

* cited by examiner

Primary Examiner—Chris Kelley
Assistant Examiner—Allen Wong
(74) Attorney, Agent, or Firm—Price and Gess

(57) ABSTRACT

Bitstream analyzing unit 111 fetches a coded block pattern and a coded quantized DCT coefficient from each block in a bitstream. Entropy decoding unit 112 decodes the coded block pattern into a block pattern and decodes the coded quantized DCT coefficient into pairs of a run length and an effectiveness factor. Dequantization unit 115 generates orthogonal transformation coefficients from the pairs of a run length and an effectiveness factor. Inverse Discrete Cosine Transform (IDCT) unit 110 generates a difference image from the orthogonal transformation coefficients. Decode controlling unit 110 instructs first selecting unit 118 to select constants "0"output from first constant generating unit 117 when the image is a "skipped" block. Image storage unit 120 stores a plurality of reference frame pictures having been decoded. Image restoring unit 119 restores an original block by adding a decoded difference image to a reference block read from the reference frame pictures stored in the image storage unit 120.

41 Claims, 26 Drawing Sheets

FIG. 1

| 1101 PIXEL NUMBER i | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | ... |
|---|---|---|---|---|---|---|---|---|---|---|---|---|---|---|---|---|---|---|---|---|---|---|---|---|
| 1102 ORIGINAL PIXEL VALUE $X_i$ | 0 | 0 | 0 | 1 | 0 | 3 | 1 | 0 | 1 | 1 | 1 | 2 | 2 | 2 | 2 | 2 | 2 | 3 | 3 | 3 | 4 | 3 | 4 | ... |
| 1103 PREDICTIVE VALUE $Y_i$ $Y_i = X_{i-1}$ | * | 0 | 0 | 0 | 1 | 0 | 3 | 1 | 0 | 1 | 1 | 1 | 2 | 2 | 2 | 2 | 2 | 2 | 3 | 3 | 3 | 4 | 3 | ... |
| 1104 PREDICTIVE DIFFERENCE $D_i$ $D_i = X_i - Y_i$ | * | 0 | 0 | 1 | -1 | 3 | -2 | -1 | 1 | 0 | 0 | 1 | 0 | 1 | -1 | 0 | 0 | 1 | 0 | 0 | 1 | -1 | 1 | ... |
| 1105 TRANSMISSION VALUE $T_i$ $T_i = D_i$ | 0 | 0 | 0 | 1 | -1 | 3 | -2 | -1 | 1 | 0 | 0 | 1 | 0 | 1 | -1 | 0 | 0 | 1 | 0 | 0 | 1 | -1 | 1 | ... |

---TRANSMISSION PATH--- 1106

| 1107 RECEPTION VALUE $R_i$ $R_i = T_i$ | 0 | 0 | 0 | 1 | -1 | 3 | -2 | -1 | 1 | 0 | 0 | 1 | 0 | 1 | -1 | 0 | 0 | 1 | 0 | 0 | 1 | -1 | 1 | ... |
|---|---|---|---|---|---|---|---|---|---|---|---|---|---|---|---|---|---|---|---|---|---|---|---|---|
| 1108 DECODED VALUE $Z_i$ $Z_i = Z_{i-1} + R_i$ | 0 | 0 | 0 | 1 | 0 | 3 | 1 | 0 | 1 | 1 | 1 | 2 | 2 | 2 | 2 | 2 | 2 | 3 | 3 | 3 | 4 | 3 | 4 | ... | ns
IMAGE DECODING APPARATUS

BACKGROUND OF THE INVENTION

(1) Field of the Invention

This invention relates to an image decoding apparatus for decoding coded data to generate moving pictures, the data having been coded in conformity with a standard such as Moving Picture Experts Group (MPEG).

(2) Description of the Prior Art

Recently, great efforts have been made to develop efficient techniques for coding/compressing moving pictures. These techniques, such as MPEG, are used in the fields of computers, communications, broadcasting, etc.

According to MPEG, the moving pictures are divided into frames, each frame being divided into a plurality of blocks, and each block generally including 64 pixels (8 pixels×8 pixels). The moving picture data is encoded block by block for each frame. The encoding procedure includes processes such as motion estimation, Discrete Cosine Transformed (DCT) being an orthogonal transformation, quantization, and entropy coding. The original moving picture data changes into coded data (bitstreams) through the above processes. Moving pictures are restored from the bitstreams by going through a reversed procedure of the coding procedure which includes entropy decoding (dividing and decoding of the bitstreams), dequantization, inverse DCT, and motion compensation.

The following is a description of the principle of "predictive coding" cited from "Gazou Deta Asshuku No Kiso Chishiki (Basic Knowledge of Image Data Compression)," Interface, December 1991, CQ Publishing Co. Predictive coding is a method of predicting current pixel values from preceding pixel values using a difference between a true value and a predictive value, the difference being called a predictive error. The method uses a unique characteristic of image data that the luminances of adjacent pixels strongly correlate.

The FIG. 1, pixel (luminance) value sequence 1112 (0, 0, 0, 1, 0, 3, 1, 0, 1, 1, . . . ) are actual values of original pixel value Xi 1102 which are processed in sequence. The luminance appears to increase gradually from the left-hand side to the right-hand side in this case. In the present description, it is assumed that each pixel holds a pixel (luminance) value ranging from "0" to "15." The numbers in the column of pixel number i 1101 represent serial numbers assigned to pixels processed in sequence. As shown in the drawing, the sequence 1112 of the original pixel value X1 1102 does not appear to change greatly in each pair of adjacent pixels. By using this characteristic, it is possible for a receiver to approximately predict each of the next pixel values. It is further possible for a transmitter to assume that the receiver will predict each next pixel value. As a result, after sending an original pixel value X1 1102, the transmitter transmits a difference D2=X2 Y1, where Y1 represents a predictive value (−X1), and X2 represents a true value. The receiver obtains the true value X2 by adding the difference D2 to the pixel value X1.

The transmitter regards a value $X_{i-1}$ as a predictive value Yi 1103 ($Yi-X_{i-1}$). The transmitter calculates predictive difference Di 1104 between predictive value Yi 1103 and true value Xi 1102. Thus, Di=Xi−Yi. The transmitter sends the calculated predictive difference Di 1104 as transmission value Ti 1105 to the receiver via transmission path 1106. The receiver receives the transmission value Ti 1105 as reception value Ri 1107 (Ri=Ti). The receiver generates decoded value Zi 1108 by adding preceding decoded value $Z_{i-1}$ to the reception value Ri 1107 ($Zi=Z_{i-1}+Ri$). After going through the above procedure, a decoded-value sequence 1118 (0, 0, 0, 1, 0, 3, 1, . . . ) is generated. Note that a pixel holding the pixel value $X_{i-1}$ preceding the original pixel value Xi is called a reference pixel.

The above method is the simplest one in which a preceding pixel is treated as a predictive value. This type of predictive coding method using pixel values of preceding pixels is called forward predictive coding, a predictive coding method using a succeeding pixel is called backward predictive coding; and a predictive coding method using a preceding pixel and a succeeding pixel is called bidirectional predictive coding.

The above predictive coding applied to adjacent pixels in a frame is called intra predictive coding. Also, this predictive coding applied to frames of moving picture data is called inter predictive coding.

In the above description of the principle, the predictive coding is performed for each pixel. In general, however, the predictive coding is performed for each block of 8 pixels×8 pixels. In this case, when a block is the same as the preceding block (called a reference block), Information indicating that these blocks are the same may be sent instead of 64 difference values "0", reducing the amount of transmitted information.

FIG. 2 shows a hierarchical structure of coded data which is generated by coding (compressing) moving picture data with a moving picture compression technique. As shown in a sequence layer 1201, a code sequence 1211 corresponding to a piece of moving picture data is divided into a plurality of Groups Of Pictures (GOP) 1212. Other information such as Sequence Header Code (SHC) is attached to each GOP when the codes are transmitted. As shown in a GOP layer 1202, each GOP 1212 is composed of a Group Start Code (GSC) being a start code of the GOP and a plurality of Intra-Coded Pictures (I pictures) 1221, Bidirectionally Predictive-Coded Pictures (B-pictures) 1222, and Predictive-Coded Pictures (P-pictures) 1223.

Each of I-pictures 1221, B-pictures 1222, and P-pictures 1223 includes the same amount of data as one frame.

The I-picture is a result of coding only one frame without obtaining a difference between the frame and other frames. The P-picture is a result of a predictive coding and includes difference values obtained from a calculation using pixel values of the current frame and the preceding frame. The B-picture is also a result of a predictive coding and includes difference values obtained from a calculation using pixel values of the current frame and the preceding and succeeding frames. As a result of this, in the decoding process, the preceding and succeeding frames of a B-picture must first be decoded before the B-picture itself is decoded. Similarly, a preceding frame should be decoded before a target P-picture is decoded.

As shown in picture layer 1203, each picture is composed of a Picture Start Code (PSC) 1233 for specifying a picture type of I-picture, P-picture, or B-picture, a Picture Coding Type (PCT) 1232, and a plurality of slices 1231.

Each slice 1231 corresponds to one of pixel sequences making up a horizontal line in a frame.

As shown in slice layer 1204, each slice 1231 is composed of a Slice Start Code (SSC) for indicating the start of the slice layer, and a plurality of Macroblocks (MB) 1241.

As shown in macroblock layer 1205, each macroblock 1241 is composed of a plurality of Blocks (B) 1251 and information such as MacroBlock Type (MBT) 1615 specifying a macroblock type such as I-picture, P-picture, or B-picture, Motion Horizontal Forward Code (MHF) 1252 indicating a horizontal element of a forward motion vector of macroblock 1241, Motion Vertical Forward Code (MVF) 1253 indicating a vertical element of the forward motion vector of macroblock 1241, Motion Horizontal Backward Code (MHB) 1254 indicating a horizontal element of a backward motion vector of macroblock 1241, Motion Vertical Backward Code (MVB) 1255 indicating a vertical element of the backward motion vector of macroblock 1241, and Coded Block Pattern (CBP) 1256 specifying a pattern of six blocks included in microblock 1241.

The blocks 1251 are generally composed of six blocks 1261, 1262, 1263, 1264, 1265, and 1266. Blocks 1261, 1262, 1263, and 1264 are each composed of an element specifying a luminance, and blocks 1265 and 1266 are each composed of an element specifying a chrominance.

The block 1271 is generally composed of 64 pixels 1272 arrayed as 8×8 pixels in vertical and horizontal directions.

Coded Block Pattern (CBP) 1256 is included only in the macroblocks of P-picture and B-picture and is a pattern of the blocks making up each macroblock.

Some blocks of P-picture and B-picture may be equal to corresponding ones in preceding/succeeding microblocks, and other blocks may not. Blocks being different from corresponding ones in preceding/succeeding macroblocks include difference values after the predictive coding; blocks being equal to those of preceding/succeeding macroblocks do not include difference values.

The block including difference values are called "skipped blocks"; the blocks including no difference values are called "not-skipped blocks." T-pictures are composed of only "not-skipped blocks." P-pictures and B-pictures are composed of "skipped blocks" and "not skipped blocks." This is the same with macroblocks.

A conventional image decoding apparatus is provided with an entropy decoding unit and a constant generating unit which operate in parallel. The entropy decoding unit entropy decodes the coded data in units of blocks. The constant generating unit generates blocks which consist of constants "0" for the skipped blocks. The entropy-decoded blocks and the blocks consisting of constants "0" then go through a dequantization process and an Inverse Discrete Cosine Transform (IDCT) process.

Error such as a partial data deletion or garbage may occur while the coded data is transmitted. When this happens, decoded data may result in a coding error, out-of-range error, or a motion vector error. The coding error happens when a variable length code not listed in a decode table is detected. The out-of-range error occurs when a motion vector value exceeds a predetermined range. The motion vector error occurs when a motion vector value exceeds a reference unit image range.

The constant generating unit generates a block consisting of constants "0" when such an error occurs so that the error block is replaced by the constant "0" block.

FIG. 4 shows the change with time in the processes performed by the conventional image decoding apparatus for each block. The drawing lists a bitstream analyzing unit, entropy decoding unit, constant generating unit, a combination of dequantization unit and IDCT unit, and image restoring unit to show blocks processed by these units in time sequence. Each block is handled by these units in this order. In the drawing, blocks B10, B12, and B14 are "not-skipped blocks"; block B11 is a "skipped block," and block B13 is a block including an error. C30–C33, C34–C37, C38–C41, C42–C45, and C46–C49 represent sets of processes respectively performed for blocks B10, B11, B12, B13, and B14.

As apparent from the above description, in the conventional image decoding apparatus, the dequantization unit and the IDCT unit process "skipped blocks," "not-skipped blocks," and error blocks all in the same way.

However, in case of "skipped blocks" and error blocks, processes by the dequantization unit and the IDCT unit are not necessary, in reality. The execution or these processes on such blocks decreases the processing speed.

On detecting a motion vector error in a block in a current slice, the conventional image decoding apparatus detects the start of the next slice to skip to the next slice. This becomes another factor for decreasing the processing speed.

Note that the conventional image decoding apparatus described above processes data in units of blocks, the unit image being a block. However, the same problems occur when data is processed in units of macroblocks.

SUMMARY OF THE INVENTION

It is therefore an object of the present invention to provide an image decoding apparatus which is more efficient and has higher functions than conventional image decoding apparatuses in that it has removed unnecessary processes, reducing processing speed.

More specifically, it is the first object of the present invention to speed up image decoding processes including "skipped" unit images.

It is the second object of the present invention to speed up error handling processes during decoding of each unit image.

It is the third object of the present invention to generate an appropriate replacement unit image in place of a unit image including an error.

The first object is achieved by an image decoding apparatus for decoding coded data to generate moving pictures, the image decoding apparatus comprising: analyzing unit for extracting a coded unit image from the coded data, where the coded unit image includes difference information which indicates whether an original unit image of the coded unit image is equal to a reference unit image which is a part of a frame picture having been decoded, and, during a predictive coding process, the original unit image is transformed into the coded unit image which includes difference values between pixel values of the original unit image and pixel values of the reference unit image when the difference information indicates that the original unit image is different from the reference unit image, where the coded unit image including the difference values is also called a coded difference unit image, the original unit image and the reference unit image each having a same, predetermined number of pixels; difference decoding unit for decoding the coded difference unit image including the difference values to generate a difference unit image; first constant generating unit for generating a first constant image which is composed of constants "0" first image selecting unit for selecting the first constant image when the difference information indicates that the original unit image is equal to the reference unit image and selecting the difference unit image when the difference information indicates that the original unit image is different from the reference unit image; and image restoring unit for restoring the original unit image by adding a result selected by the first image selecting unit to the reference unit image.

With the above described construction, a unit image being composed of constants "0" generated by the first constant generating unit is selected when an extracted unit image is a part of a P-picture or a B-picture and is a "skipped" unit image; a unit image decoded by the difference decoding unit is selected when an extracted unit image is a "not-skipped" unit image. A selected unit image is then added to a reference unit image having been decoded to restore an original unit image. In this way, an unnecessary process of decoding the "skipped" unit image is omitted. This reduces the time taken for decoding coded data.

In the above image decoding apparatus, the first constant generating unit may generate a third constant image which is composed of as many constants "0" as a number of pixels included in the predetermined number of original unit images, the judging unit may further judge whether all of the predetermined number of original unit images are equal to the predetermined number of reference unit images from the pattern identifier and the pattern table, the selecting unit may select the third constant image generated by the third constant generating unit when the judging unit judges that all of the predetermined number of original unit images are equal to the predetermined number of reference unit images, the second constant generating unit may generate as many second constants as the predetermined number of pixels in each original unit image, and the image restoring unit may include: effectiveness factor generating unit for decoding coded difference unit images out of the predetermined number of coded unit images in sequence to generate one or more pairs of an effectiveness factor and a run length for each of the coded difference unit images; second constant generating unit for generating constants "0" called second constants and for generating as many constants "0," which are called fourth constants, as a number of pixels included in each original unit image, second image selecting unit, when the judging unit judges that not all of the predetermined number of original unit images are equal to the predetermined number of reference unit images, for selecting the fourth constants generated by the second constant generating unit for each original unit block being equal to corresponding reference unit image to generate a coefficient sequence composed of the selected fourth constants, and selecting as many second constants as specified by the run lengths generated by the effectiveness factor generating unit for each original unit block being different from corresponding reference unit image to generate a coefficient sequence by combining the selected second constants with the effectiveness factors generated by the effectiveness factor generating unit; dequantization unit for executing a dequantization on the coefficient sequence generated by the second image selecting unit to generate an orthogonal transformation coefficient sequence; and conversion unit for executing an inverse orthogonal transformation on the orthogonal transformation coefficient sequence to generate a difference unit image.

With the above described construction, the first selecting unit selects the third constant image generated by the first constant generating unit when the current macroblock is "skipped" macroblock in a P-picture or a B-picture. In case of "not-skipped" macroblocks, the second image selecting unit selects the fourth constants for each original block being equal to corresponding reference block and selects as many second constants as specified by the run lengths generated by the effectiveness factor generating unit. This reduces the time taken for decoding coded data.

The second object is achieved by the above image, decoding apparatus in which the image restoring unit includes: first error detecting unit for detecting an out-of-range error which indicates that the coded difference unit image includes a value exceeding a predetermined range, the image decoding apparatus further comprises: first error controlling unit for instructing the image restoring unit to stop restoring the coded difference unit image when the first error detecting unit detects the out-of-range error, and the image restoring unit further includes: error image restoring unit for generating a replacement unit image using a reference unit image of the reference frame pictures stored in the image storage unit and writing the replacement unit image into the first frame picture stored in the image storage unit in place of the coded difference unit image when an error is detected.

The second object is also achieved by the above image decoding apparatus in which the image restoring unit further includes: second error detecting unit for detecting a motion compensation error, where the first error controlling unit instructs the image restoring unit to stop restoring the coded difference unit image when the second error detecting unit detects the motion compensation error.

With either of the above constructions, decoding an error unit image in stopped and an original unit image is restored using a reference unit image stored in the image storage unit when an error is detected during decoding of a unit image or during the restoring process in which an original unit image is restored by adding a reference unit image to a selected unit image. This reduces the time taken for decoding coded data.

With the above construction, when a motion vector error is detected, a compensation process is executed in which an original unit image is restored using a reference unit image in the image storage unit and the current slice including the error unit image is skipped to a next slice. This parallel processing reduces the time taken for decoding coded data.

That is to say, in conventional techniques, the time taken for the error compensation process is composed of the times taken for "error compensation process" and "fetching of the next slice." However, in the present inventions the time is composed of either longer time taken for "error compensation process" or "fetching of the next slice." This reduces the time taken for error handling processes.

The third object is achieved by the above image decoding apparatus in which the image restoring unit further includes: frame picture copying unit for reading a reference frame picture from the image storage unit and writing the read reference frame picture into the image storage unit as the first frame picture before restoration of the currently decoded frame picture is started, the partial restoring unit includes: unit image restoring unit for restoring the original unit image and writing the restored original unit image into the first frame picture stored in the image storage unit when both the first error detecting unit and the second error detecting unit fail to detect all error, and the image restoring unit includes: image write prohibiting unit for prohibiting the error image restoring unit from writing the replacement unit image into the first frame picture when either of the first error detecting unit and the second error detecting unit detects an error.

With the above construction, a reference frame picture is copied from the image storage unit and written into the image storage unit as a frame picture to be decoded before restoration process is started. Restored original unit images are written over the copied frame picture. If an error is detected writing the error unit image is prohibited. As a result, the error unit image is compensated without executing an active error compensation process.

The third object is also achieved by the above image decoding apparatus in which the error image restoring unit includes: image reading unit for reading a reference unit image of the reference frame pictures stored in the image storage unit when either of the first error detecting unit and the second error detecting unit detects an error, where the read reference unit image, in terms of positioning in frame picture, corresponds to the coded difference unit image from which the error is detected; and replacement image writing unit for writing the reference unit image read by the image reading unit into the first frame picture stored in the image storage unit as the replacement unit image.

With the above constructions, the error unit image is compensated by a corresponding reference unit image in a preceding frame picture having been restored.

The above objects are also achieved by an image decoding apparatus for decoding coded data to generate moving pictures, the image decoding apparatus comprising: first processing unit which includes; analyzing unit for extracting a coded unit image from the coded data, where the encoded unit image includes difference information which indicates whether an original unit image of the coded unit image is equal to a reference unit image which is a part of a frame picture having been decoded, and, during a predictive coding process, the original limit image is transformed into the coded unit image which includes difference values between pixel values of the original unit image and pixel values of the reference unit image when the difference information indicates that the original unit image is equal to the reference unit image, where the coded unit image including the difference values is also called a coded difference unit image, the original unit image and the reference unit image each having a same, predetermined number of pixels; effectiveness factor generating unit for decoding the coded difference unit image to generate one or more pairs of an effectiveness factor and a run length; second constant generating unit for generating constants "0" where the constants "0" generated by the second constant generating unit are called second constants; and second image selecting unit for selecting as many second constants as specified by the run lengths generated by the effectiveness factor generating unit and generating a coefficient sequence by combining the selected second constant with the effectiveness factors generated by the effectiveness factor generating unit; first storage unit for storing the coefficient sequence generated by the second image selecting unit; second processing unit which includes: dequantization unit for reading the coefficient sequence from the first storage unit and executing a dequantization on the coefficient sequence to generate an orthogonal transformation coefficient sequence; and conversion unit for executing an inverse orthogonal transformation on the orthogonal transformation coefficient sequence to generate this difference unit image; decoiled storage unit for storing the original unit image restored by the conversion unit; third processing unit which includes: first constant generating unit for generating a first constant image which is composed of constants "0"; first image selecting unit for selecting the first constant image when the difference information indicated that the original unit image is equal to the reference unit image and selecting the original unit image stored in the second storage unit when the difference information indicates that the original unit image is different from the reference unit image; image storage unit for storing one or more reference frame pictures having been decoded and a first frame picture which is a currently decoded frame picture; and partial restoring unit for reading a reference unit image from the reference frame pictures stored in the image storage unit, restoring the original unit image by adding the unit image selected by the first image selecting unit to the read reference unit image, and writing the restored original unit image into the first frame picture stored in the image storage unit; and sequential controlling unit for executing a pipeline control on the first processing unit, the second processing unit, and the third processing unit.

With the above construction, the first processing unit includes analyzing unit, effectiveness factor generating unit, second constant generating unit, and second image selecting unit; the second processing unit includes dequantization unit and conversion unit; the third processing unit includes first constant generating unit, image storage unit, and partial restoring unit. The first and second storage unit are respectively placed between the three processing units. The three processing units are executed in parallel under the pipeline control, resulting in further reduction of the processing time.

As apparent from the above description, the image decoding apparatus of the present invention achieves high-speed processing of "skipped" blocks and error blocks, which yields a great practical merit.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1 illustrates a predictive coding;

DESCRIPTION OF THE PREFERRED EMBODIMENTS

1. First Embodiment

The first embodiment of the present invention, an image decoding apparatus, is described below.

1.1 Construction of Image Decoding Apparatus

Figure 5:
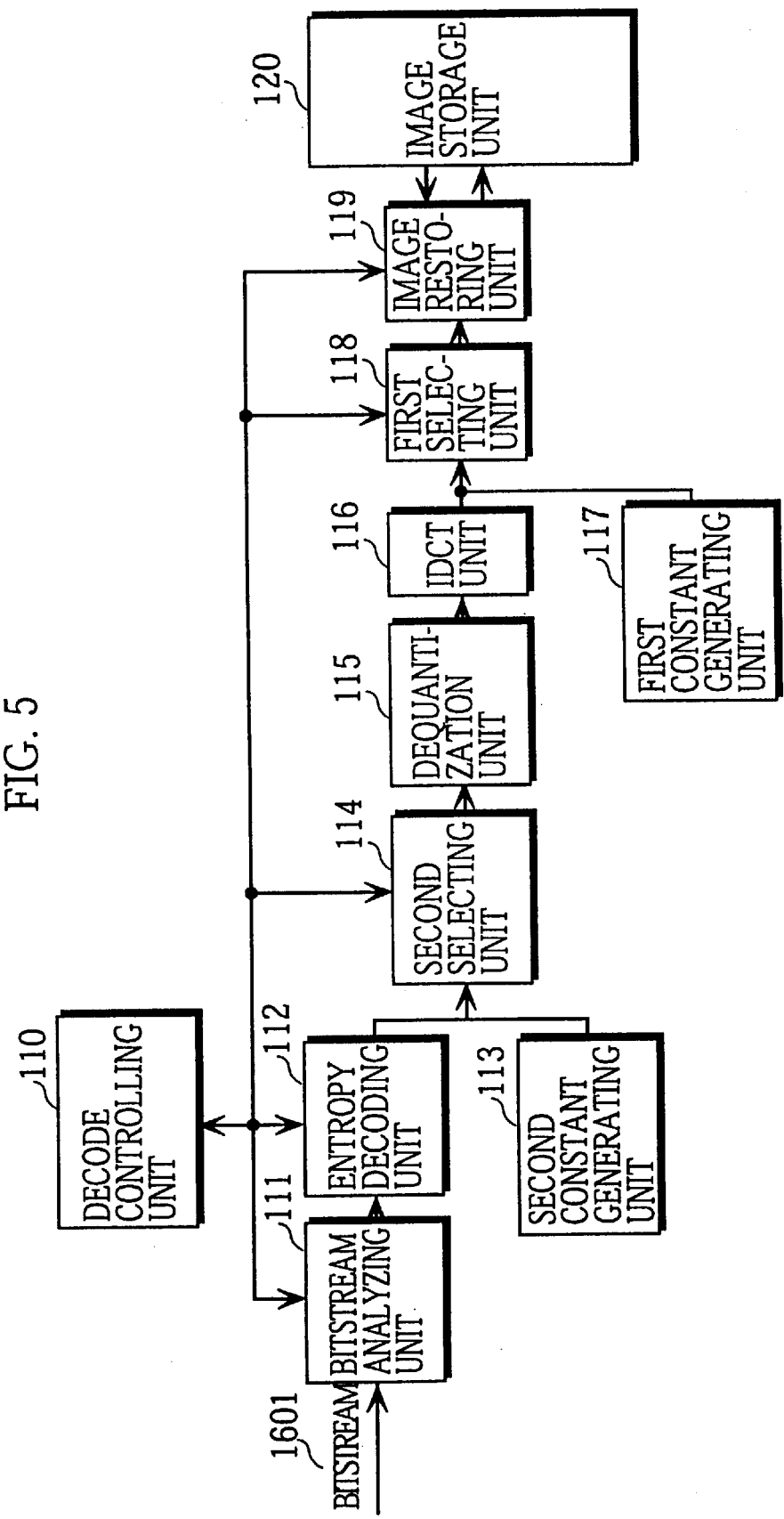
FIG. 5 is a block diagram showing a construction of the image decoding apparatus of the first embodiment of the present invention.

FIG. 5 is a block diagram showing a construction of the image decoding apparatus of the first embodiment of the present invention.

The image decoding apparatus is composed of a decode controlling unit 110, a bitstream analyzing unit 111, an entropy decoding unit 112, a second constant generating unit 113, a second selecting unit 114, a dequantization unit 115, an Inverse Discrete Cosine Transform (IDCT) unit 116, a first constant generating unit 117, a first selecting unit 118, an image restoring unit 119, and an image storage unit 120.

Note that the present image decoding apparatus processes images in units of blocks.

The image decoding apparatus is explained below for each element.

1.1.1 Bitstream Analyzing Unit 111

The bitstream analyzing unit 111 analyzes a bitstream 1601, which is input in serial, to detect the starts of GOPs, starts of pictures, starts of slices, starts of macroblocks, and starts of blocks. The bitstream analyzing unit 111 also fetches from the bitstream 1601 a coded picture coding type 1611 specifying the I-picture, P-picture, or B-picture, a coded motion vector 1612, a coded quantized DCT coefficient 1613, a coded macroblock pattern identifier 1614, and a coded macroblock type 1615, and outputs them to entropy decoding unit 112, where "macroblock pattern identifier" is referred to as "block pattern" in MPEG.

Also, the bitstream analyzing unit 111 receives a coding error 1602, an out-of-range error 1603, or a motion vector error 1604 from a decode controlling unit 110. On receiving one of the above errors, the bitstream analyzing unit 111 stops analyzing the current slice and starts analyzing the next slice. On detecting an end code from the bitstream 1601, the bitstream analyzing unit 111 ends analyzing the bitstream 1601.

1.1.2 Entropy Decoding Unit 112

On receiving the coded picture coding type 1611, coded motion vector 1612, coded quantized DCT coefficient 1613, coded macroblock pattern identifier 1614, and coded macroblock type 1615 from bitstream analyzing unit 111, the entropy decoding unit 112 entropy decodes them using a decode table. The coded picture coding type 1611, coded motion vector 1612, coded macroblock pattern identifier 1614, and coded macroblock type 1615 are respectively decoded to the picture coding type. 1623, motion vector 1625, macroblock pattern identifier 1624, and macroblock type 1628, which are then sent to the decode controlling unit 110.

The coded quantized DCT coefficient 1613 is decoded to one or more pairs of a run length 1621 and an effectiveness factor 1631. The run lengths 1621 are sent to the decode controlling unit 110, and the effectiveness factors 1631 are sent to the second selecting unit 114.

When the entropy decoding will 112 recognizes that the decode table does not include any of the received coded picture coding type 1611, coded motion vector 1612, coded quantized DCT coefficient 1613, coded macroblock pattern identifier 1614, and coded macroblock type 1615, the entropy decoding unit 112 regards it as the coding error, and sends the coding error 1602 to the decode control unit 110.

1.1.3 Second Constant Generating Unit 113

The second constant generating unit 113 generates "constants 0" 1632.

1.1.4 Decode Controlling Unit 110

The decode controlling unit 110 receives the coding error 1602, picture coding type 1623, macroblock pattern identifier 1624, motion vector 1625, and macroblock type 1628 from the entropy decoding unit 112 and receives the motion vector error 1604 from the image restoring unit 119.

The decode controlling unit 110 detects an out-of-range error when the motion vector 1625 sent from the entropy decoding unit 112 is out of a predetermined range.

The coding error and the out-of-range error indicate that the present block does not satisfy a predetermined condition.

The decode controlling unit 110 transfers the received coding error 1602 to the bitstream analyzing unit 111, and on detecting the out-of-range error, the decode controlling unit 110 sends the out-of-range error 1603 to the image restoring unit 119.

The decode controlling unit 110 receives the motion vector error 1604 from the image restoring unit 119, and transfers it to the bitstream analyzing unit 111.

The decode controlling unit 110 receives the motion vector 1625 from the entropy decoding unit 112, and transfers it to the image restoring unit 119.

The decode controlling unit 110 controls the second selecting unit 114 as described below so that the coded quantized DCT coefficients 1613 are converted into the quantized DCT coefficients 1641.

Figure 2:
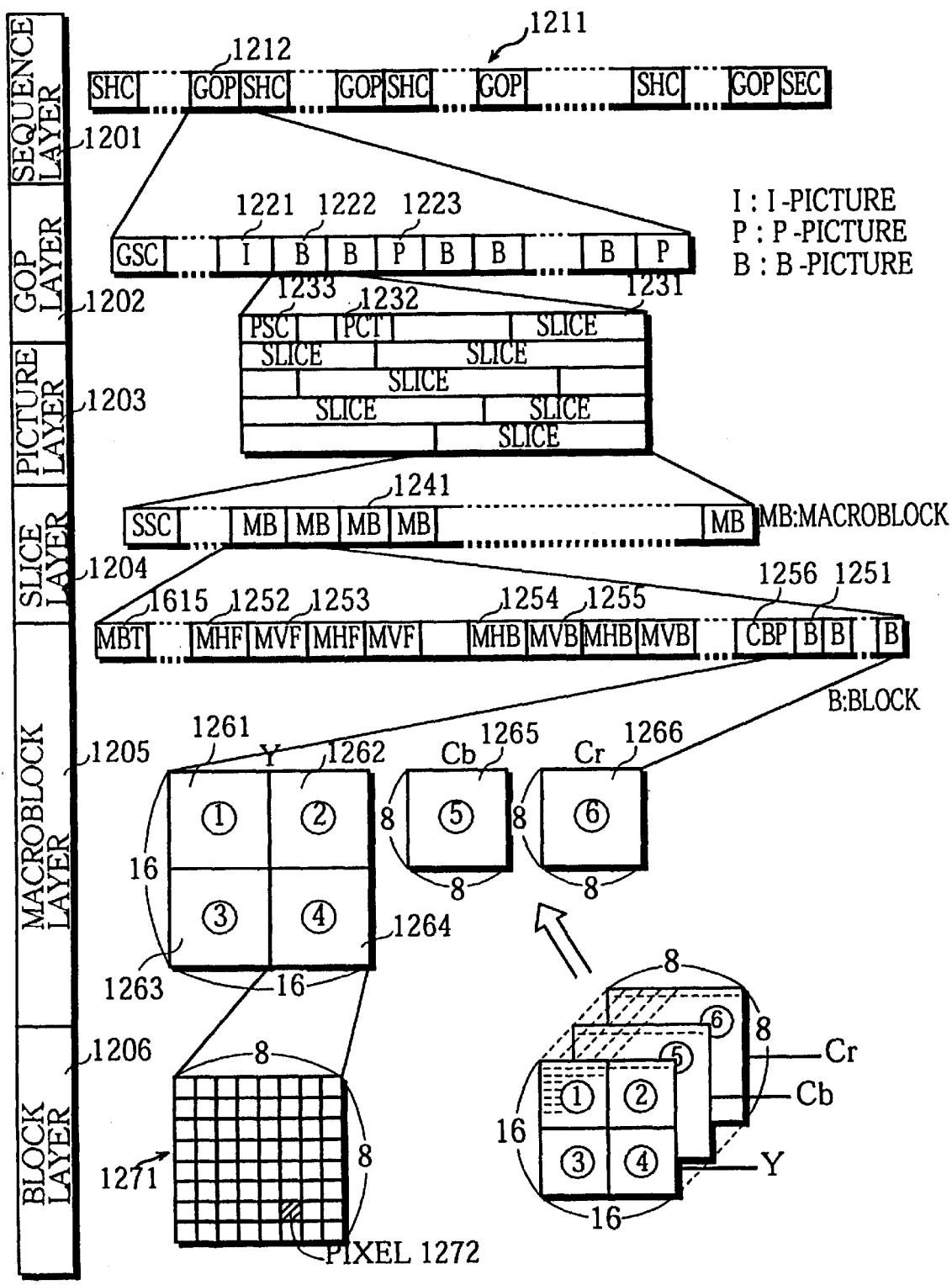
FIG. 2 shows a hierarchical structure or coded data which is generated by coding moving pictures.
Figure 3:
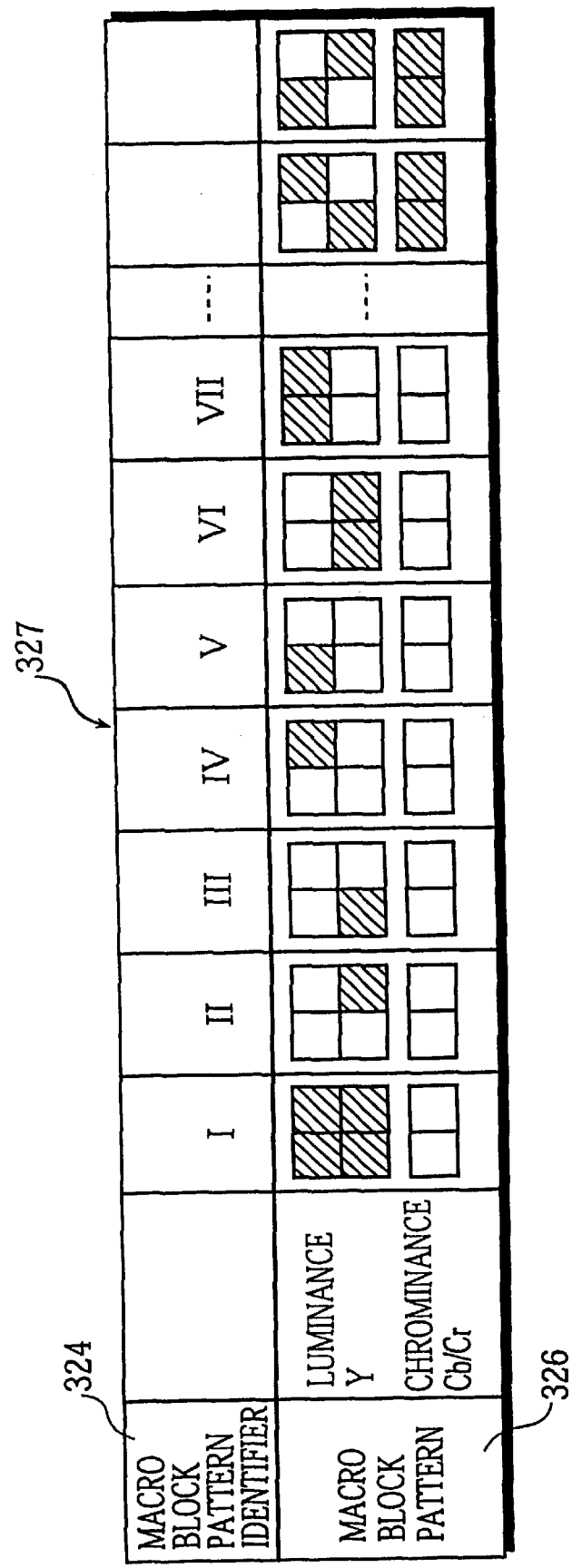
FIG. 3 shows macroblock patterns.
Figure 4:
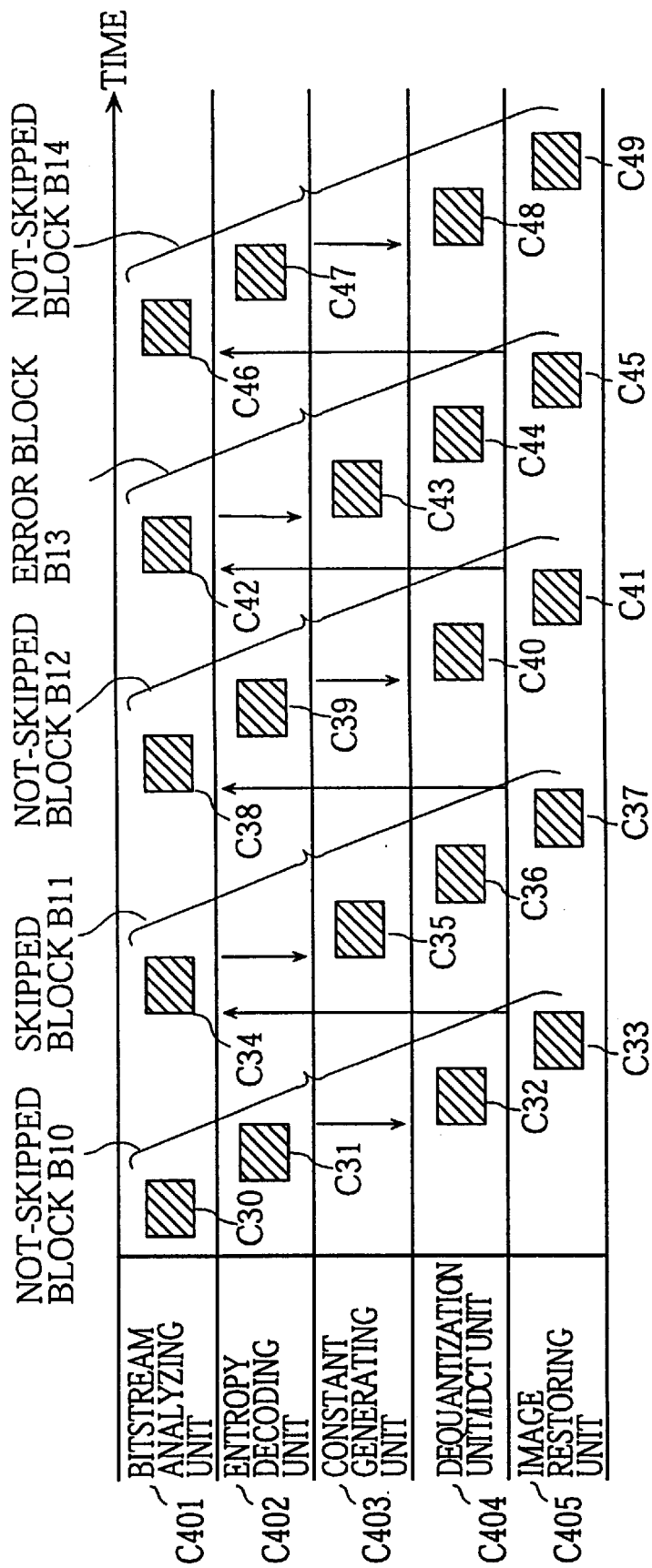
FIG. 4 is a time chart showing change with time in the processes performed by the conventional image decoding apparatus.

FIG. 3 shows an macroblock pattern table 327 including a variety of macroblock patterns. The boxes with slanted line represent blocks including difference values between the blocks themselves and those of preceding/succeeding macroblocks. The macroblock pattern table 327 is stored in the decode controlling unit 110, and is composed of macroblock pattern identifiers 324 and the corresponding macroblock patterns 326. The decode controlling unit 110 refers to this table to determine a macroblock pattern 1626 matching a received macroblock pattern identifier 1624. When the target block includes difference values, the decode controlling unit 110 sets a block difference flag, that is, set 1 to the block difference flag; otherwise, the decode controlling unit 110 resets a block difference flag, that is, sets 0 to the block difference flag.

When the block difference flag is set (set to "1"), the decode controlling unit 110 outputs a selection instruction 1633 to the second selecting unit 114 so that it selects as many "constants 0" 1632 as specified by run lengths 1621 which are received from the second constant generating unit 113, then instructs the second selecting unit 114 to select effectiveness factors 1631 output from the entropy decoding unit 112.

When the block difference flag is reset (set to "0") indicating that the current block is "skipped block," the decode controlling unit 110 outputs a selection instruction 1712 to the first selecting unit 118 so that the first selecting unit 118 receives 64 "constants 0" 1632 from the first constant generating unit 117.

During the above processes, the selected effectiveness factors 1631 are combined with "constants 0" 1632 to generate quantized DCT coefficients 1641.

The decode controlling unit 110 receives a macroblock type 1628 to identify a coding type of the present macroblock. The macroblock type 1628 specifies one of the forward predictive coding, backward predictive coding, bidirectional predictive coding, and intra coding. When the macroblock type is the forward predictive coding, backward predictive coding, or bidirectional predictive coding, the decode controlling unit 110 recognizes that one or more blocks in the current macroblock include difference values, and instructs the second selecting unit 114 to process as described above.

1.1.5 Second Selecting Unit 114

On receiving the selection instruction 1633 from the decode controlling unit 110, the second selecting unit 114 selects effectiveness factors 1631 output from the entropy decoding unit 112 or "contants 0" 1632 output from the second constant generating unit 113. The selected effectiveness factors 1631 are combined with "constants 0" 1632 to generate quantized DCT coefficients 1641. The quantized DCT coefficients 1641 are output to the dequantization unit 115.

The second selecting unit 114 selects as many "constants 0" 1632 output from the second constant generating unit 113 as specified by the decode controlling unit 110 in accordance with the selection instruction 1633 output from the decode controlling unit 110.

1.1.6 Dequantization Unit 115

The dequantization unit 115 performs a dequantization on quantized DCT coefficients 1641 output from the second selecting unit 114 to generate DCT coefficients 1651, and outputs them to the IDCT unit 116.

1.1.7 IDCT Unit 116

The IDCT unit 116 performs an IDCT on the DCT coefficients 1651 output from the dequantization unit 115 to generate a restoration unit image 1661, and outputs it to the first selecting unit 118.

1.1.8 First Constant Generating Unit 117

When it is judged that the current block is "skipped block," the first constant generating unit 117 sends a block consisting of "constants 0" 1632 to the first selecting unit 118 so that the first selecting unit 118 output the block to the image restoring unit 119.

1.1.9 First Selecting Unit 118

On receiving the selection instruction 1712 from the decode controlling unit, 110, the first selecting unit 118 receive the restoration will image 1661 output from the IDCT unit 116 or "constant 0" 1662 output from the first constant generating unit 117, then outputs the received one to the image restoring unit 119.

The restoration unit image 1661 to which "constants 0" 1662 are added is called an integrated unit image 1663.

The first selecting unit 118 receives a specification "64" and the selection instruction 1712 from the decode controlling unit 110 and receives 64 "constants 0" 1662 from the first constant generating unit 117.

1.1.10 Image storage Unit 120

The image storage unit 120 stores a currently decoded frame picture 1692 and a plurality of reference frame pictures 1691 having been restored.

1.1.11 Image Restoring Unit 119

The image restoring unit 119 receives Line the motion vector 1625, picture coding type 1623, macroblock type 1628, coding error 1602, and out-of-range error 1603 from the decode controlling unit 110, and also receives the restoration unit image 1661 and "constants 0" 1662 from the first selecting unit 118.

The image restoring unit 119 identifies the macroblock type of the present macroblock including the currently decoded block by referring to the received macroblock type 1628.

When the present macroblock is intra coding type, the image restoring unit 119 writes the current integrated unit image 1663 (currently decoded block) into the image storage unit 120 as a restoration unit image 1661 at a corresponding position in the frame picture 1692.

When the present macroblock is the forward predictive coding, backward predictive coding, or bidirectional predictive coding, the image restoring unit 119 reads out from the image storage unit 120 a reference unit image 1686 corresponding to the current integrated unit image 1663, adds the read reference unit image 1686 to the integrated unit image 1663 to generate a synthesized unit image 1687, and writes the generated synthesized unit image 1607 into the image storage unit 120 at a corresponding position in the frame picture 1692.

The image restoring unit 119 identifies a restoration unit image in the reference frame pictures 1691 specified by the motion vector 1625 and regards the restoration unit image as a reference unit image 1686. Note that such a process of generating a restoration unit image by adding difference values to a reference unit image in a reference frame picture specified by a motion vector is called a motion compensation.

The image restoring unit 119 detects a motion vector error if the motion vector 1625 indicates a value outside the range of the reference frame picture 1619 in the image storage unit 120 when the current integrated unit image 1663 is a P-picture or B-picture.

On detecting the motion vector error, the image restoring unit 119 stops decoding the rest or blocks in the present slice and reads blocks in a slice in the reference frame picture 1691 which correspond to the current block and the succeeding blocks in a slice, and writes the read blocks into the image storage unit 120 at a corresponding position in the currently decoded frame picture 1692. This process is called an image compensation at an error detection. This process is described in detail later.

The image restoring unit 119 handles the coding error 1602 and the out-of-range error 1603 in the same way as the motion vector error 1604.

The blocks read from the reference frame picture 1691 to be written into the frame picture 1692 at an error detection are called a substitute unit image.

The image restoring unit 119 transfers the motion vector error to the decode controlling unit 110.

1.2 Date Flow in Image Decoding Apparatus

Figure 6:
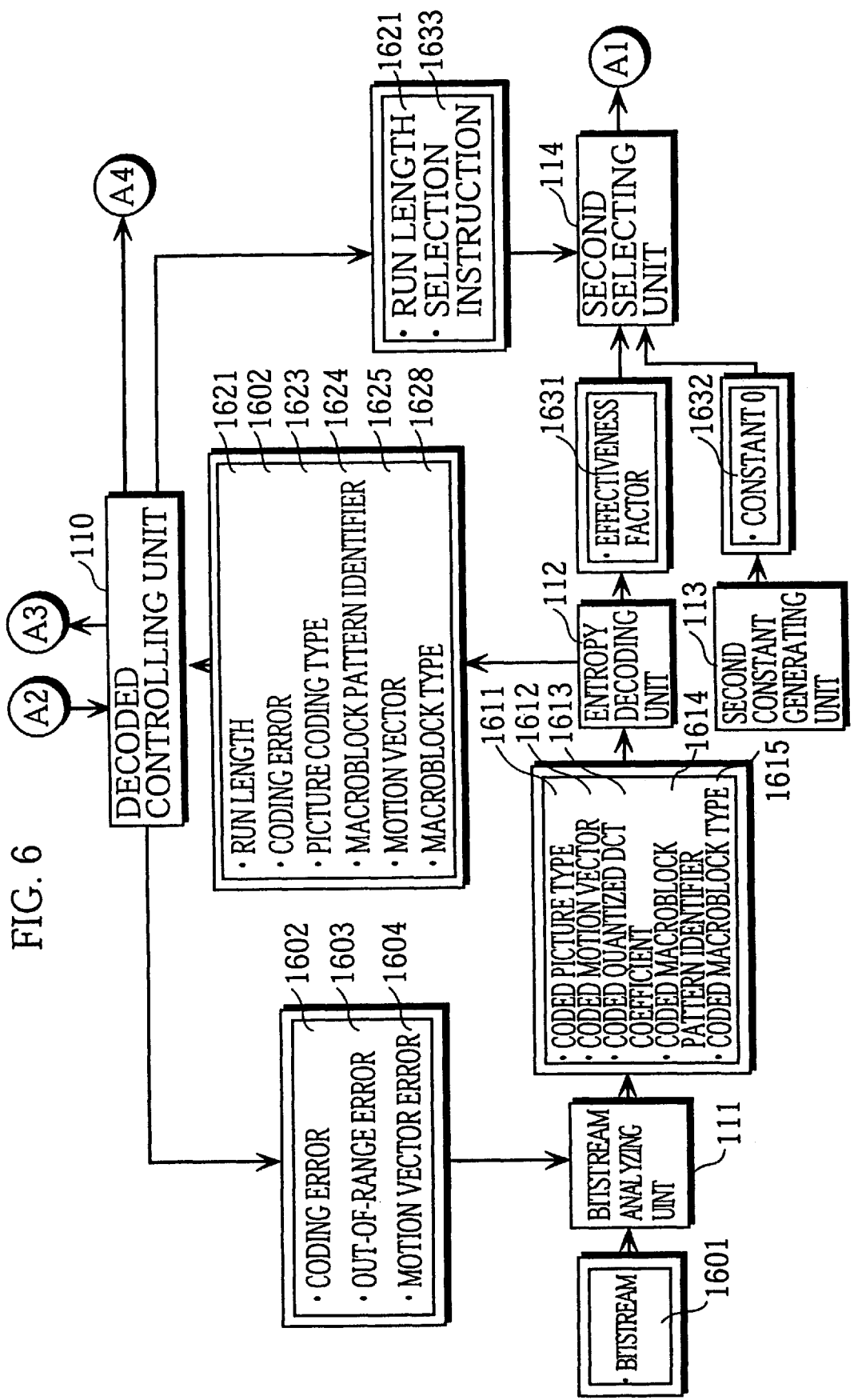
FIG. 6 shows data flow in the image decoding apparatus shown in FIG. 5.
Figure 7:
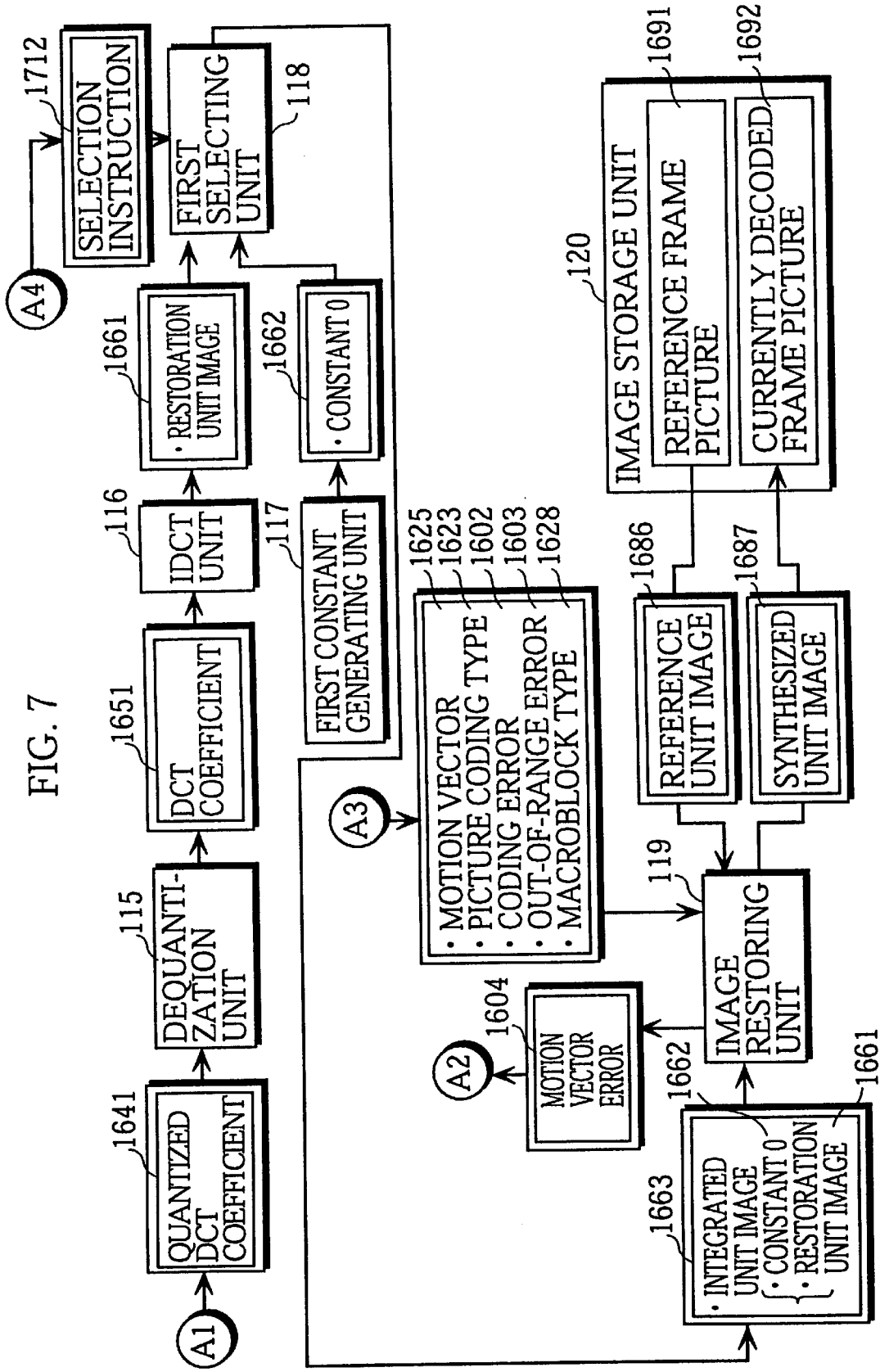
FIG. 7 shows data flow in the image decoding apparatus shown in FIG. 5, continued from FIG. 6.

The data flow in the image decoding apparatus constructed shown in FIG. 5 is described with reference to FIGS. 6 and 7. Note that in FIGS. 6 and 7, boxes drawn with a single line represent elements of the image decoding apparatus boxes drawn with two lines represent data transferred between each element.

The bitstream 1601 is input from outside of the present apparatus to the bitstream analyzing unit 111.

The coding error 1602, out-of-range error 1603, motion vector error 1604 are output from the decode control unit 110 to the bitstream analyzing unit 111.

The coded picture coding type 1611, coded motion vector 1612, coded quantized DCT coefficient 1613, coded macroblock pattern identifies 1614, and coded macroblock type 1615 are output from the bitstream analyzing unit 111 to the entropy decoding unit 112.

The run length 1621, coding error 1602, picture coding type 1623, macroblock pattern identifies 1624, motion vector 1625, and macroblock type 1628 are output from the entropy decoding unit 112 to the second selecting unit 114.

The effectiveness factors 1631 are output from the entropy decoding unit 112 to the second selecting unit 114.

"Constants 0" 1632 are output from the second constant generating unit 113 to the second selecting unit 114.

The run length 1621 and the selection instruction 1633 are output from the decode control unit 110 to the second selecting unit 114.

The quantized DCT coefficient 1641 is output from the second selecting unit 114 to the dequantization unit 115.

The DCT coefficient 1651 is output from the dequantization unit 115 to the TDCT unit 116.

The restoration unit image 1661 is output from the IDCT unit 116 to the first selecting unit 118.

The "constants 0" 1662 is output from the first constant generating unit 117 to the first selecting unit 118.

The selection instruction 1712 is output from the decode controlling unit 110 to the first selecting unit 118.

The integrated unit image 1663 being a result of adding "constant 0" 1662 to restoration unit image 1661 is output from the first selecting unit 118 to the image restoring unit 119.

The motion vector error 1604 is output from the image restoring unit 119 to the decode controlling unit 110.

The picture coding type 1623, motion vector 1625, macroblock type 1628, out-of-range error 1603, and coding error 1602 are output from the decode controlling unit 110 to the image restoring unit 119.

The reference unit image 1686 is output from the image storage unit 120 to the image restoring unit 119.

The synthesized unit image 1687 is output from the image restoring unit 119 to the image storage unit 120.

1.3 Operation of Image Decoding Apparatus

Figure 8:
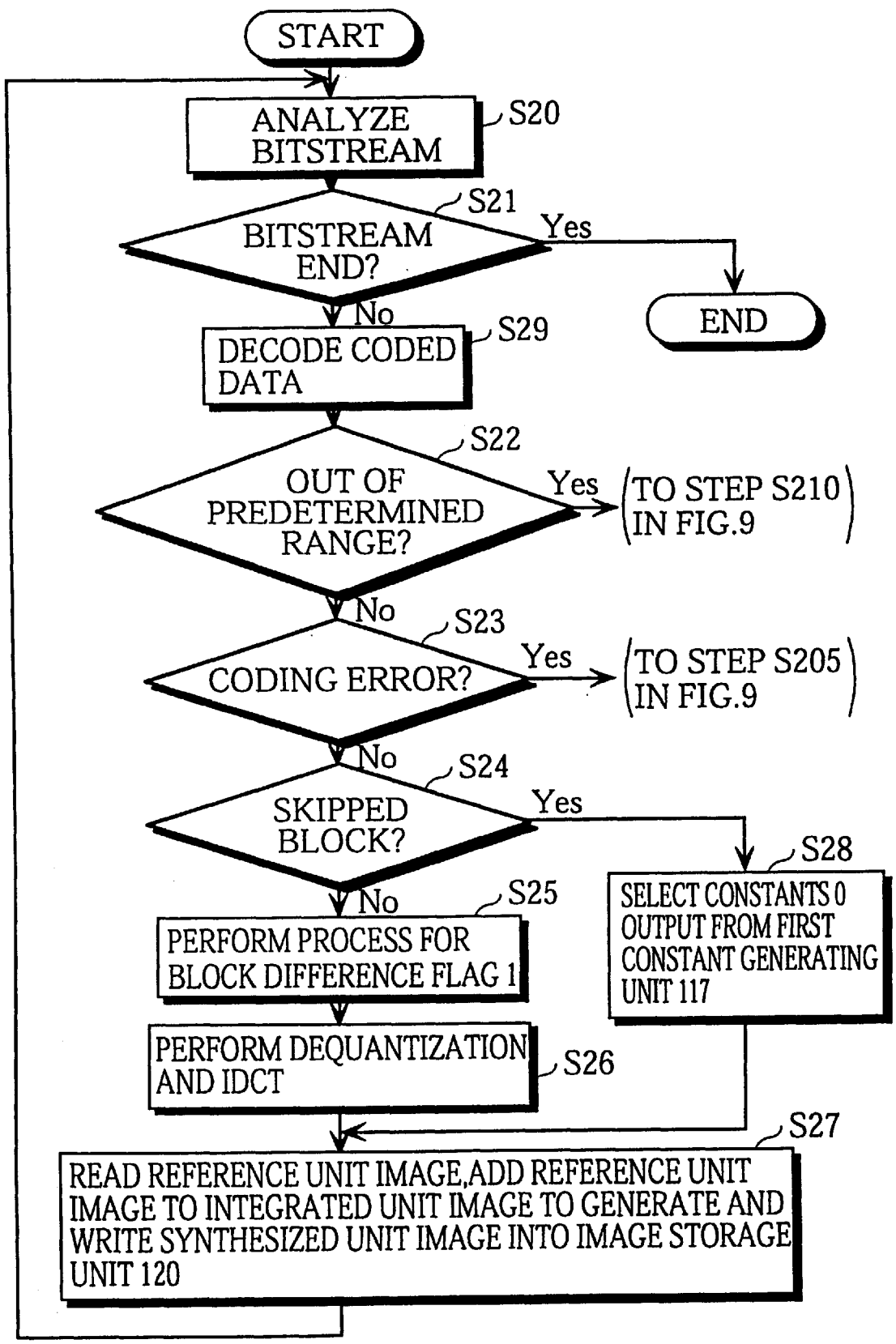
FIG. 8 is a flowchart showing the operation of the image decoding apparatus shown in FIG. 5.

The operation of the image decoding apparatus is described below with reference to the flowchart shown in FIG. 8, in particular, an operation for "skipped blocks" in P-pictures or B-pictures.

The bitstream analyzing unit 111 Analyzes and fetches from the bitstream 1601 the coded picture coding type 1611, coded motion vector 1612, coded quantized DCT coefficient 1613, coded macroblock pattern identifier 1614, and coded macroblock type 1615, and outputs them to entropy decoding unit 112 (step S20).

On detecting an end code from the bitstream 1601, the bitstream analyzing unit 111 ends analyzing the bitstream 1601 (S21).

On receiving coded picture coding type 1611 to coded macroblock type 1615 from bitstream analyzing unit 111, the entropy decoding unit 112 entropy decodes the coded picture coding type 1611, coded motion vector 1612, coded macroblock pattern identifier 1614, and coded macroblock type 1615 to generate the picture coding type 1623, motion vector 1625, macroblock pattern identifier 1624, and macroblock type 1628 and sends them to the decode controlling unit 110. The entropy decoding unit 112 entropy decodes coded quantized DCT coefficient 1613 to generate run lengths 1621 and effectiveness factors 1631. When the entropy decoding unit 112 recognizes that the decode table does not include any of the elements 1611–1615, the entropy decoding unit 112 regards it as the coding error, and sends the coding error 1602 to the decode control unit 110 (S29).

In stop S22, it is judged whether the motion vector 1625 is out of a predetermined range. Control proceeds to step S23 when the judgement is negative in step S22. In step S23, it is judged whether the decode controlling unit 110 has received the coding error 1602 from the entropy decoding unit 112. When the results of these judgements are affirmative, the decode controlling unit 110 sends the out-of-range error 1603 and the coding error 1602 to the bitstream analyzing unit 111 and image restoring unit 119 respectively so that these errors are handled the same as the motion vector error 1604 which is described later.

In step S24, it is judged whether the current block is "skipped block." This is checked by referring to the block difference flag which has been sent by the decode controlling unit 110 in accordance with the received macroblock pattern identifier 1624: if the flag is "0," then the block is "skipped block"; if the flag is "1," the block is "not-skipped block." When it is judged in step S24 that the block is "not-skipped block" (flag=1), the decode controlling unit 110 instructs the second selecting unit 114 to select as many "constants 0" 1632 output from the second constant generating unit 113 as specified by received run lengths 1621 and then to select the effectiveness factors 1631 (S25). Then, the second selecting unit 114, on receiving an instruction from the decode controlling unit 110, selects the effectiveness factors 1631 or "constants 0" 1632 to generate the quantized DCT coefficient 1641. The dequantization unit 115 performs a dequantization on quantized DCT coefficient 1641 to generate the DCT coefficient 1651. The IDCT unit 116 performs an IDCT on the DCT coefficient 1651 to generate a restoration unit image 1661, and outputs it to the first selecting unit 118 (S26).

When the present macroblock is a part of an I-picture, the image restoring unit 119 writes the currently decoded block as the restoration unit image 1661 into the image storage unit 120 at a corresponding position in the frame picture 1692.

When the present macroblock is a part of a P-picture or a B-picture, the image restoring unit 119 reads out from the image storage unit 120 a reference unit image 1686 corresponding to the current integrated unit image 1663, adds the read reference unit image 1686 to the present integrated unit image 1663 to generate a synthesized unit image 1687, and writes the generated synthesized unit image 1687 into the image storage unit 120 at a corresponding position in the frame picture 1692 (S27).

When it is judged in step S24 that the block is "skipped block" (flag=0), the decode controlling unit 110 instructs the first selecting unit 118 to receive 64 "constants 0" 1632 from the first constant generating unit 117. The first selecting unit 118 outputs a block consisting of the received 64 "constants 0" 1632 as the restoration unit image 1661 to the image restoring unit 119 (S28). Then, in step S27, the present integrated unit image 1663 is added to the reference unit image 1686 in the image storage unit 120 to generate a synthesized unit image 1687. The synthesized unit image 1687 is written into the image storage unit 120 at a corresponding position in the frame picture 1692 (S27).

The control returns to step S20 after the process in step S27 completes.

Figure 9:
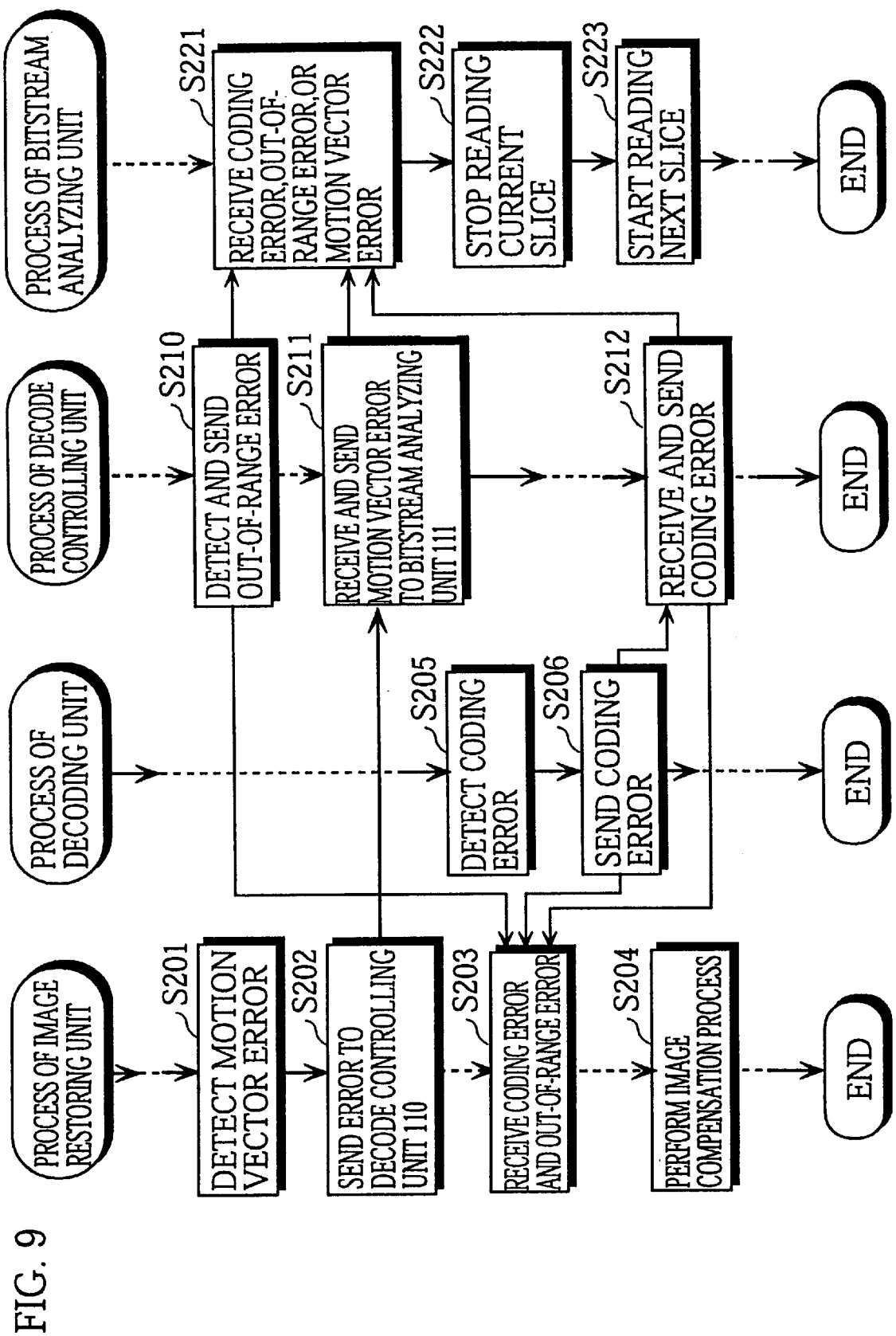
FIG. 9 is a flowchart showing the error handling processes of the image decoding apparatus shown in FIG. 5.

Now, error handling processes are described with reference to the flowchart shows in FIG. 9. The drawing shows processes of each of the image restoring unit 119, entropy decoding unit 112, decode controlling unit 110, and bitstream analyzing unit 111. Note that the drawing does not show processes which are not relevant to the error handling processes. The dotted lines in the drawing indicate that certain processes are performed between the processes connected by the dotted lines.

On detecting a motion vector error (step S201), the image restoring unit 119 sends the motion vector error 1604 to the decode controlling unit 110 (S202). This leads to the image compensation process (S204). On receiving the motion vector error 1604 from the image restoring unit 119, the decode controlling unit 110 transfers it to the bitstream analyzing unit 111 (S211). On receiving the motion vector error 1604 from the decode controlling unit 110 (S221), the bitstream analyzing unit 111 skips the currently decoded slice (S222) and starts reading the next slice (S223). In this way, the image compensation process and the slice skipping are performed in parallel.

On detecting a coding error (S205), the entropy decoding unit 112 sends the coding error 1602 to the decode controlling unit 110 and the image restoring unit 119 (S206). On receiving the coding error 1602, the decode controlling unit 110 transfers it to the bitstream analyzing unit 111 (S212). On receiving the coding error 1602 from the decode controlling unit 110 (S221), the bitstream analyzing unit 111 skips the currently decoded slice (S222) and starts reading the next slice (S223), as in the process of the motion vector error 1604. Simultaneously, the image restoring unit 119 performs the image compensation process (S204).

On detecting an out-of-range error, the decode controlling unit 110 sends the out-of-range error 1603 to the bitstream analyzing unit 111 and the image restoring unit 119 (S210). On receiving the out-of-range error 1603 (S221), the bitstream analyzing unit 111 skips the currently decoded slice (S222) and starts reading the next slice (S223), as in the process of the motion vector error 1604. Simultaneously, the image restoring unit 119 performs the image compensation process (S204).

1.4 Process Change with Time

Figure 10:
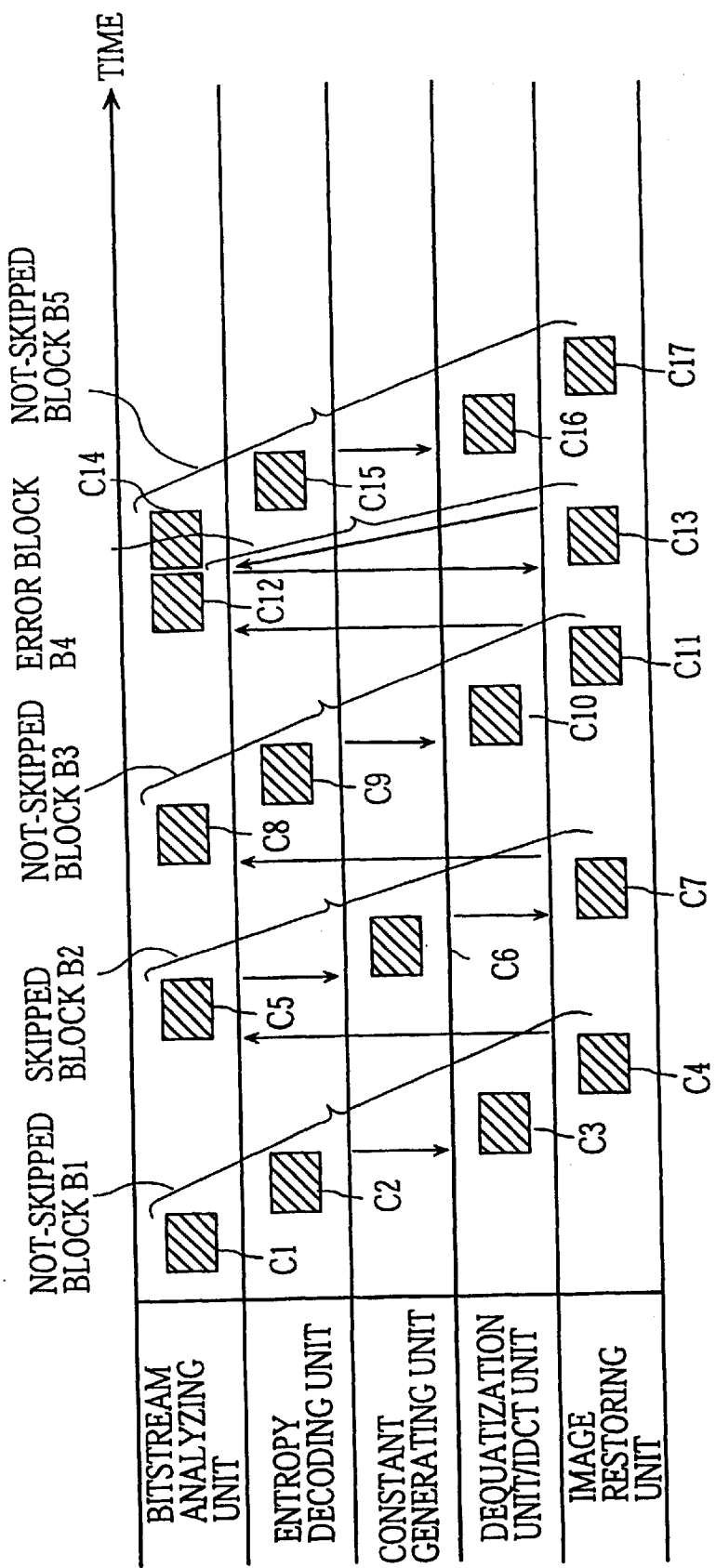
FIG. 10 is a time chart showing change with time in the processes performed by the image decoding apparatus constructed as shown in FIG. 5.

FIG. 10 shows the change with time in the processes performed by the image decoding apparatus constructed as shown in FIG. 5. The drawing lists the bitstream analyzing unit 111, entropy decoding unit 112, first constant generating unit 117, a combination of dequantization unit 115 and IDCT unit 116, and image restoring unit 119 to show blocks processed by these units in time sequence. Each block is handled by these units in this order. In the drawing, blocks B1, B3, and B5 are "not-skipped blocks", block B2 is "skipped block", and block B4 is a block including an error. C1–C4, C5–C7, C8–C11, C12–C13, and C14–C17 represent sets of processes respectively performed for blocks B1, B2, B3, B4, and B5.

An shown in the drawing, C1–C12 are processed in sequence; C13 and C14 are processed simultaneously; and C15–C17 are processed in sequence.

For blocks B2 and B4, dequantization and IDCT processes are not performed.

1.5 Embodiment Variations

It is needless to say that the above embodiment should be achieved strictly as described. Several variations of the first embodiment are described below.

1.5.1 Processing Macroblocks as Unit Images

In the construction shown in FIG. 5, the unit image is a block. However, the unit image may be a macroblock. This case is described below.

As described above, each block of a macroblock may be skipped or may not be skipped.

When it is judged that all blocks in the current macroblock are "skipped blocks," the first selecting unit 118 may receive a macroblock consisting of "constants 0" 1632 from the first constant generating unit 117 and output it to the image restoring unit 119.

When it is judged that one or more blocks in the current macroblock are "not-skipped blocks," the decode controlling unit 110 may control as follows: for "skipped blocks," the second selecting unit 114 receives blocks consisting of "constant 0" 1632 from the second constant generating unit 113; for "not-skipped blocks," the second selecting unit 114 receives blocks entropy decoded by the entropy decoding unit 112. The second selecting unit 114 outputs the blocks consisting of "constants 0" 1632 and the decoded blocks to the dequantization unit 115.

With the above construction, the process speed is increased since the dequantization and IDCT processes are omitted when all blocks in the current macroblock are "skipped blocks."

Suppose a case in which macroblocks M1 and M2 are decoded in sequence, where all blocks in the M1 are "skipped block," and one or more blocks in M2 are "not-skipped blocks." Formula 1 below represents the time taken for processing with a conventional image decoding apparatus; Formula 2 represents the time taken for the same processing with the image decoding apparatus constructed as shown in FIG. 5. As apparent from a comparison between the following formulas, the image decoding apparatus constructed as shown in FIG. 5 reduces the process time by the time taken for dequantization and IDCT of M1. As a result, when all blocks in M1 are "skipped blocks," the process speed can be increased.

<Formula 1>
Conventional Process Time
=(time taken for entropy decoding of M1)
+(time taken for dequantization and IDCT of M1)
+(time taken for restoration of M1)
|(time taken for entropy decoding of M2)
+(time taken for dequantization and IDCT of M2)
+(time taken for restoration of M2)

<Formula 2>
Present Embodiment Process Time
=(time taken for entropy decoding of M1)
+(time taken for restoration of M1)
+(time taken for entropy decoding of M2)
+(time taken for dequantization and IDCT of M2)
+(time taken for restoration of M2)

1.5.2 Processing Blocks as Unit Images and Macroblock as Restoration Unit Images In the construction shown in FIG. 5, each of the unit image and restoration unit image is a block. However, the unit image may be a block and the restoration unit image may be a macroblock. This case is described below.

The image restoring unit 119 includes an integrated unit image storage unit for storing six integrated unit images.

Each time the image restoring unit 119 receives an integrated unit image consisting of blocks output from the first selecting unit 118, the image restoring unit 119 stores the received integrated unit image in the integrated unit image storage unit.

When the integrated unit image storage unit becomes full with six integrated unit images, the image restoring unit 119 generates six restoration unit images in sequence from the six integrated unit images, and writes the generated restoration unit images into the image storage unit 120 at corresponding positions in the frame picture 1692.

1.5.3 First Constant Generating Unit to Generate Constant in Error Occurrence

The coding error and the out-of-range error may be handled the same as the "skipped blocks." That is, when either of the errors occurs, the decode controlling unit 110 does not send the coding error 1602 and the out-of-range error 1603 to the bitstream analyzing unit 111 and the image restoring unit 119, but instructs the first selecting unit 118 so that it receives 64 "constants 0" 1632 from the first constant generating unit 117. With the above operation, the image restoring unit 119 can compensate the block image with an error without performing a special image compensation process.

In the above case, the error block is replaced by a corresponding block in the preceding image, namely, the reference image.

1.5.4 Different Number of Pixels in Blocks and Macroblock

In the first embodiment described above, a block is composed of 64 pixels. However, it is needless to say that the number of the pixels in a block is not limited to 64. For example, one block may include 16 vertical pixels multiplied by horizontal 16 pixels, namely, 256 pixels in total.

In the first embodiment described above, a macroblock is composed of six blocks. However, for example, one macroblock may be composed of 16 blocks showing the luminance and two blocks showing the chrominance.

As apparent from the above description, the number of pixels in a block or a macroblock is not limited.

1.5.5 Variation of First Constant Generating Unit

The first constant generating unit 117 may output four constants 0 and the first selecting unit 118 may receive the four constants 0 from the first constant generating unit 117 16 times. With this arrangement, the first selecting unit 118 receives 64 constants 0 in total. As apparent from this example, the first constant generating unit 117 may output a certain number of constants 0 and the first selecting unit 118 may receive the certain number of constants 0 so as to receive 64 constants 0 in total.

The first constant generating unit 117 may be composed of a constant generating unit and a constant controlling unit, where the constant generating unit generates one constant 0, and the constant controlling unit controls the constant generating unit so that the constant generating unit repeats the generation of constant 0 as many as the number of pixels in one block, that is, 64 times which are received and output by the constant controlling unit.

As another variation, the first constant generating unit 117 may generate one constant 0, and the first selecting unit may receive the constant 0 as many times as the number of pixels in one block, that is, 64 times. In this case, the image restoring unit 119 adds the 64 constants 0 to the referent unit image 1686 read out from the image storage unit 120.

1.5.6 Intra Picture Predictive Decoding

In the above embodiment, data having been coded with the predictive coding method using preceding/succeeding frames is decoded. However, the above embodiment may be applicable to a unit image of one frame having been coded and represented by difference values between the unit image and another unit image of the same frame.

1.5.7. Unit in Error Handling Processes

In the above embodiment, the bitstream analyzing unit 111 skips to the next slice when a coding error, out-of-range error, or motion vector error is detected in a block in the current slice. However, in such a case, the bitstream analyzing unit 111 may skip to the next block, or may skip to the next macroblock, or may skip to the next set of macroblocks in the current slice.

2. Second Embodiment

The second embodiment of the present invention, an image decoding apparatus, is described below.

2.1 Construction of Image Decoding Apparatus

Figure 11:
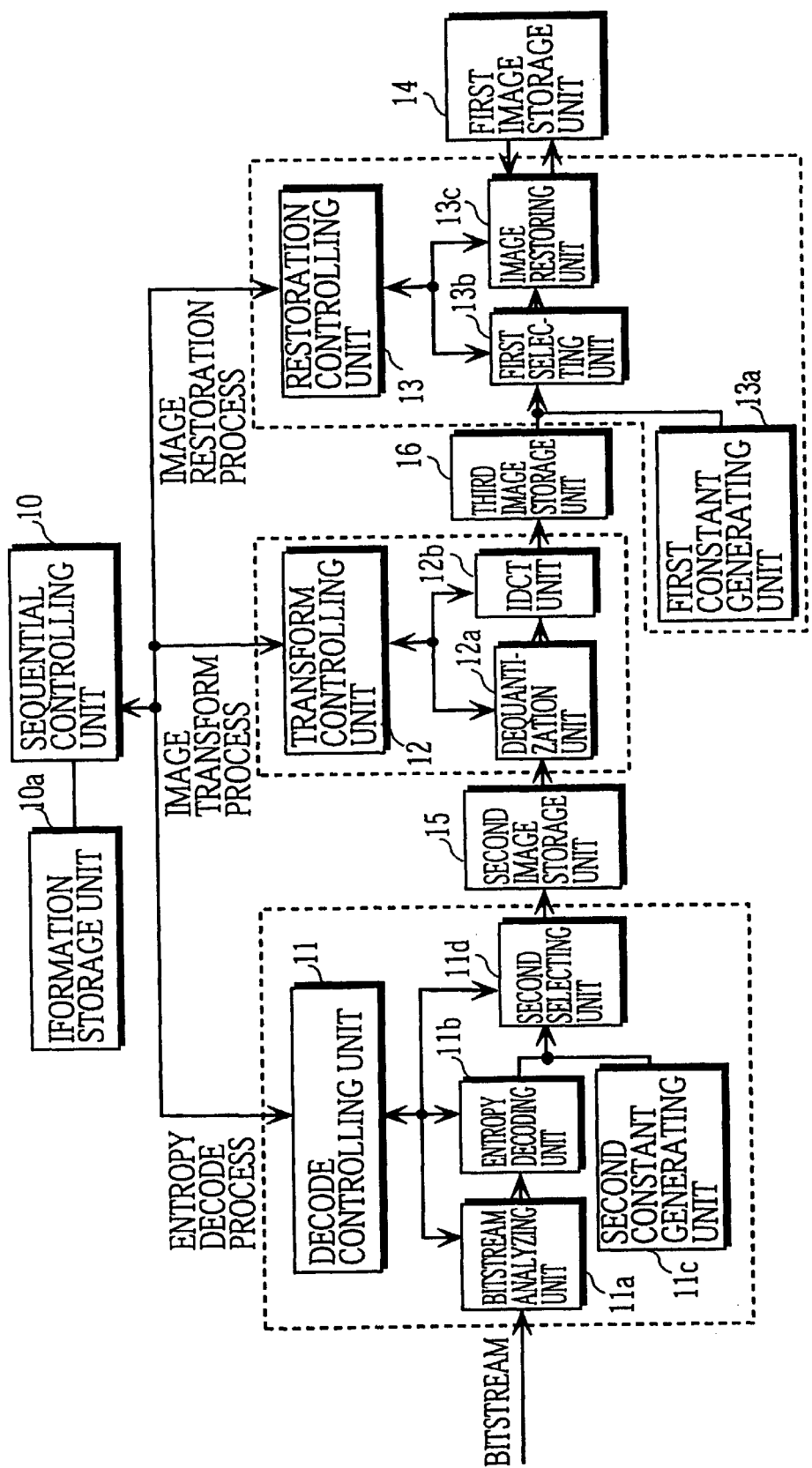
FIG. 11 is a block diagram showing a construction of the image decoding apparatus of the second embodiment.
Figure 12:
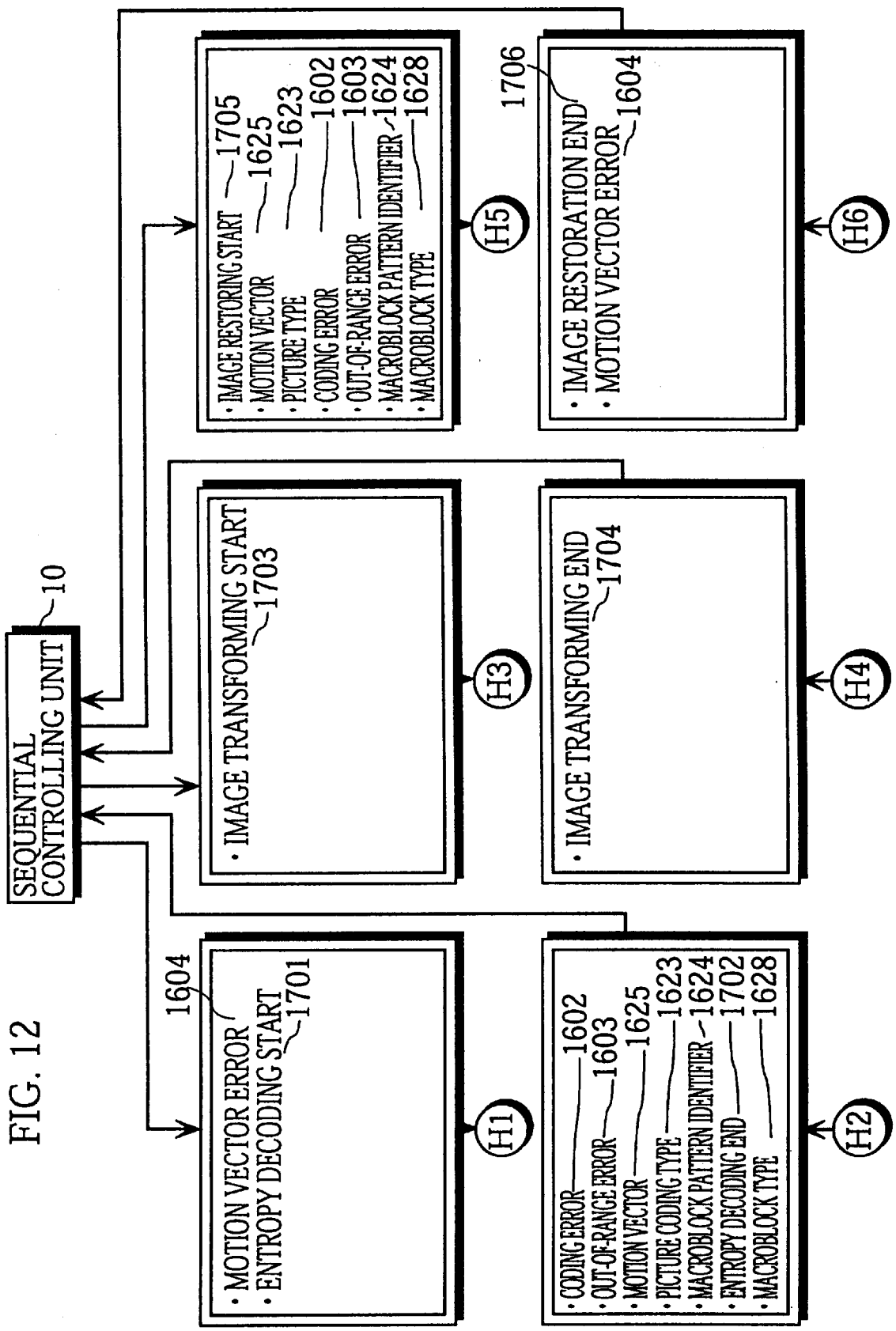
FIG. 12 shows data flow in the image decoding apparatus shown in FIG. 11.
Figure 13:
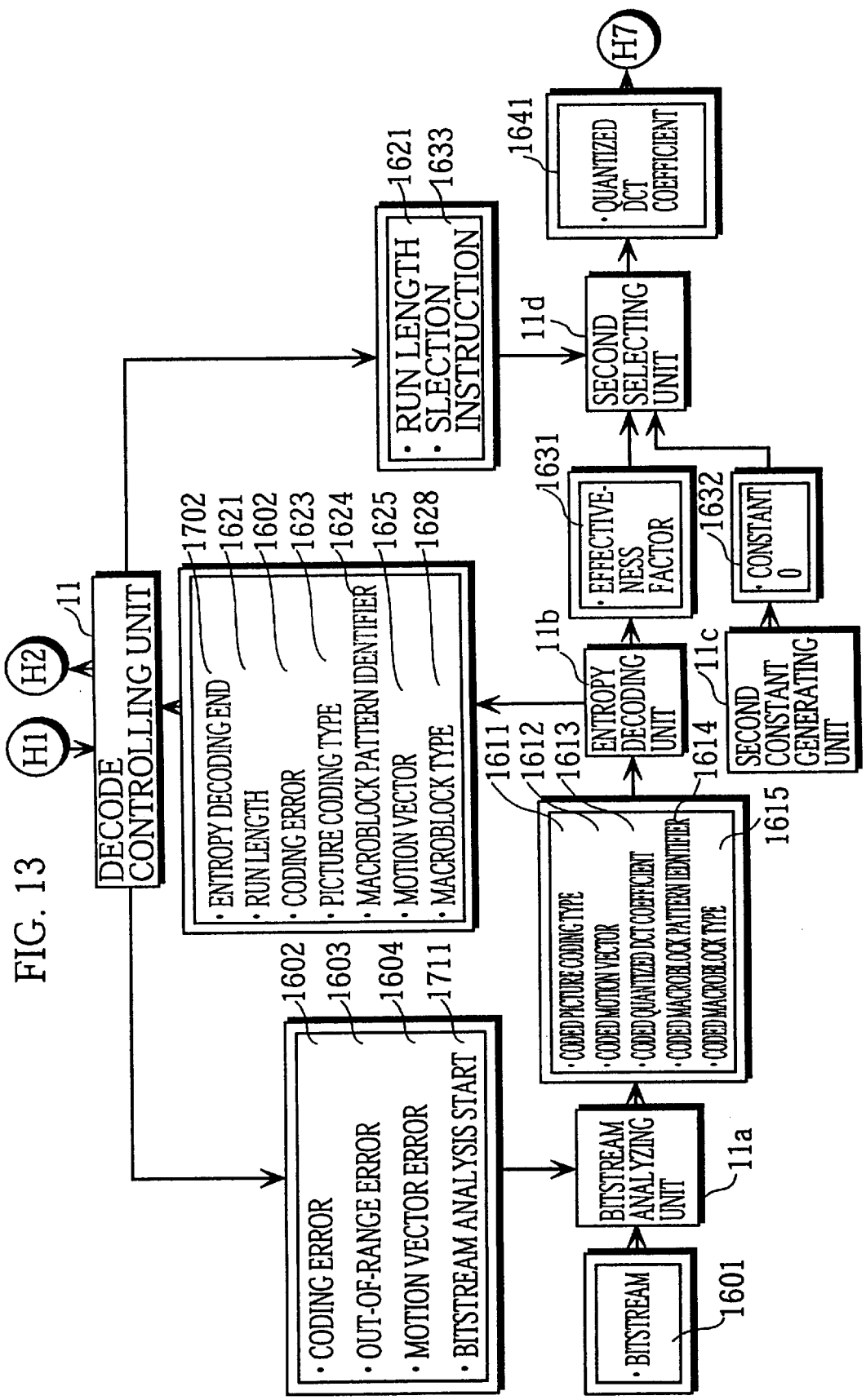
FIG. 13 shows data flow in the image decoding apparatus shown in FIG. 11, continued from FIG. 12.
Figure 14:
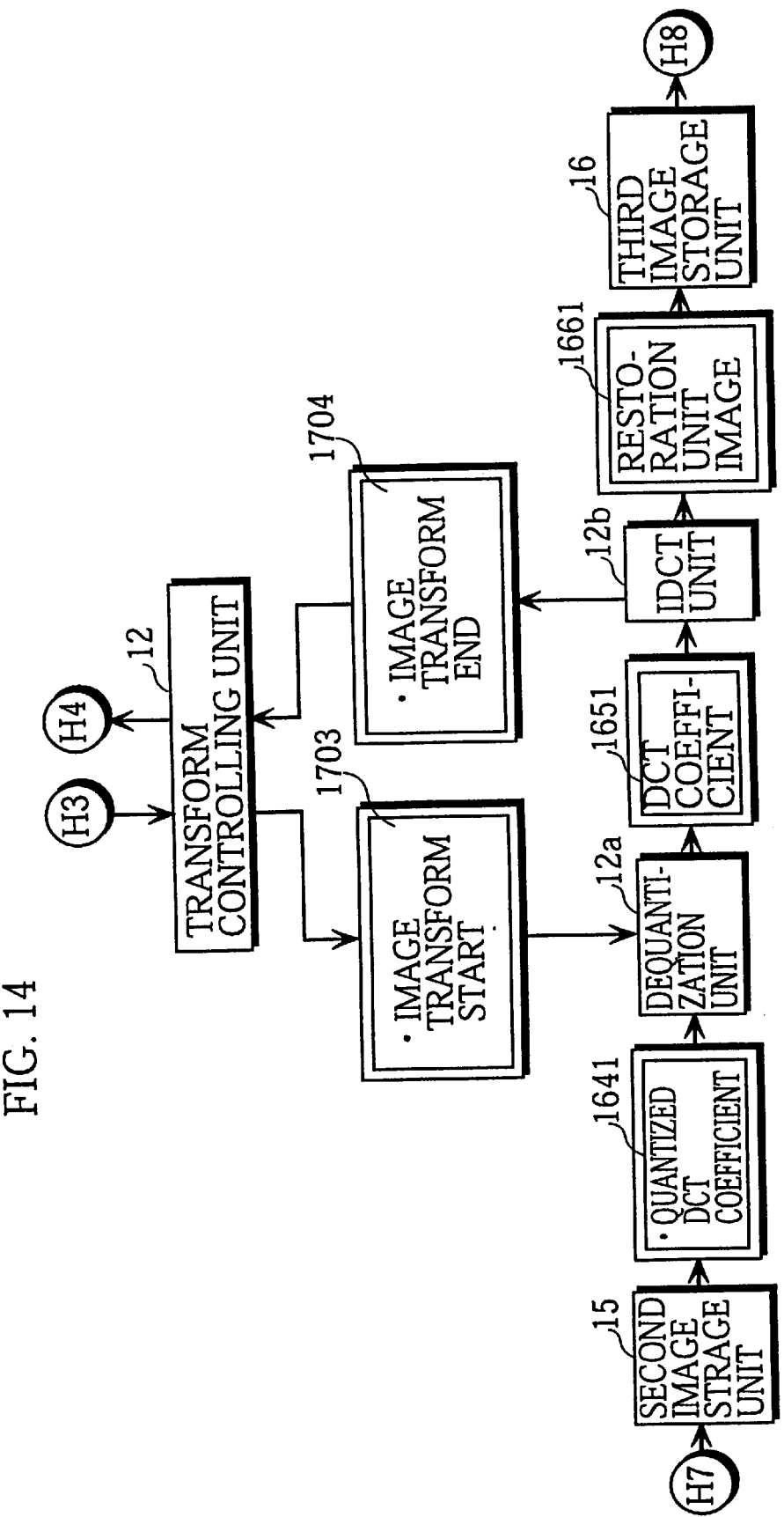
FIG. 14 shows data flow in the image decoding apparatus shown in FIG. 11, continued from FIG. 13.
Figure 15:
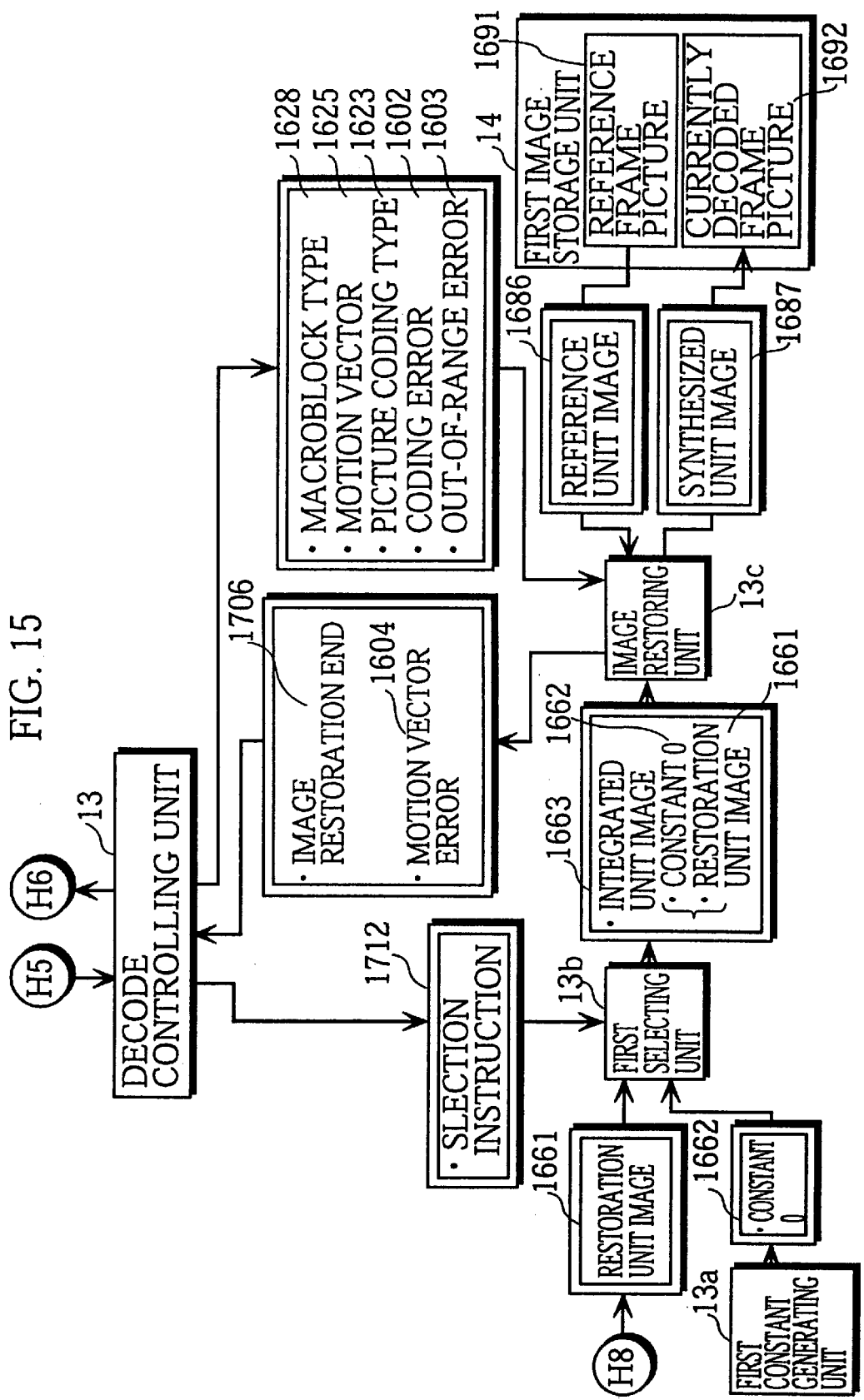
FIG. 15 shows data flow in the image decoding apparatus shown in FIG. 11, continued from FIG. 14.

FIG. 11 is a block diagram showing a construction of the image decoding apparatus of the second embodiment.

The image decoding apparatus is composed of a sequential controlling unit 10, an information storage unit 10a, a decode controlling unit 11, a bitstream analyzing unit 11a, an entropy decoding unit 11b, a second constant generating unit 11c, a second selecting unit 11d, a transform controlling unit 12, a dequantization unit 12a, an Inverse Discrete Cosine Transform (IDCT) unit 12b, a restoration controlling unit 13, a first constant generating unit 13a, a first selecting unit 13b, an image restoring unit 13c, a first image storage unit 14, a second image storage unit 15, and a third image storage unit 16.

Note that the decode controlling unit 11, bitstream analyzing unit 11a, entropy decoding unit 11b, second constant generating unit 11c, second selecting unit 11d, dequantization unit 12d, IDCT unit 12b, first constant generating unit 13a, first selecting unit 13b, image restoring unit 13c, first image storage unit 14 respectively correspond to the elements 110, 111, 112, 113, 114, 115, 116, 117, 118, 119, and 120 in the First Embodiment.

In the following description of the construction of the image decoding apparatus, the second constant generating unit 11c and the first image storage unit 14 are omitted since they are equivalent to the corresponding elements 113 and 120. The description will focus on new, additional, or changed features. Note that the present image decoding apparatus processes images in units of blocks.

A process achieved by decode controlling unit 11, bitstream analyzing unit 11a, entropy decoding unit 11b, second constant generating unit 11c, and second selecting unit 11d is called an entropy decode process; a process achieved by transform controlling unit 12, dequantization unit 12a, and IDCT unit 12b is called an image transform process; and a process achieved by restoration controlling unit 13, first constant generating unit 13a, first selecting unit 13b, and image restoring unit 13c is called an image restoration process.

2.1.1. Transform Controlling Unit 12

The transform controlling unit 12 controls dequantization unit 12a and IDCT unit 12b. On receiving an image transform start instruction 1703 from the sequential controlling unit 10, transform controlling unit 12 instructs dequantization unit 12a to perform a dequantization process. On receiving an image transform end information 1704 from the IDCT unit 12b, transform controlling unit 12 transfers the information 1704 to the sequential controlling unit 10.

2.1.2 Second Image Storage Unit 15

The second image storage unit 15 temporarily stores data output from the entropy decode process. The stored data is then input to the image transform process, which makes it possible to perform the entropy decode process and the image transform process simultaneously.

More specifically, the second image storage unit 15 stores data output from the second selecting unit 11d, the data being output from the entropy decoding unit 11b and second constant generating unit 11c to the second selecting unit 11d.

2.1.3 Third Image Storage Unit 16

The third image storage unit 16 temporarily stores data output from the image transform process. The stored data is then input to the image restoration process, which makes it possible to perform the image transform process and the image restoration process simultaneously.

More specifically, the third image storage unit 16 stores data output from the IDCT unit 12b.

2.1.4 First Constant Generating Unit 13a

The first constant generating unit 13a outputs a block consisting of "constants 0" to the first selecting unit 13b when the current block is a "skipped block." The block is than output to the image restoration unit 13c.

2.1.5 First Selecting Unit 13b

The first selecting unit 13b reads out data from the third image storage unit 16 or receives a block consisting of constants 0 from the first constant generating unit 13a.

2.1.6 Restoration Controlling Unit 13

The restoration controlling unit 13 controls the first constant generating unit 13a, first selecting unit 13b, and image restoring unit 13c, and also transfers data between the sequential controlling unit 10 and the image restoring unit 13c.

On receiving an image restoration start 1705 from the sequential controlling unit 10, the restoration controlling unit 13 sends a selection instruction 1712 to the first selecting unit 13b so that the first selecting unit 13b reads out data from the third image storage unit 16 or receives a block consisting of constant 0 from the first constant generating unit 13a. On receiving an image restoration end 1706 from the image restoring unit 13c, the restoration controlling unit 13 transfers the image restoration end 1706 to the sequential controlling unit 10.

On receiving a motion vector error 1604 from the image restoring unit 13c, the restoration controlling unit 13 transfers it to the sequential controlling unit 10, and transfers a motion vector 1625, a picture coding type 1623, and a macroblock type 1628 from the sequential controlling unit 10 to the image restoring unit 13c.

On receiving a coding error 1602 or an out-of-range error 1603 from the sequential controlling unit 10, the restoration controlling unit 13 transfers it to the image restoring unit 13c. On receiving macroblock pattern identifier 1624 indicating that the block is a "skipped block," the restoration controlling unit 13 instructs the first selecting unit 13b to receive 64 constants 0 from the first constant generating unit 13a.

2.1.7 Sequential Controlling Unit 10

The sequential controlling unit 10 activates the entropy decode process only when conditions for executing the process are satisfied, and controls the process so that the process is not repeated. The sequential controlling unit 10 controls the image transform process and the image restoration process in the same way. For this purpose, the sequential controlling unit 10 sends an entropy decoding start 1701 to the decode controlling unit 11, an image transforming start 1703 to the transform controlling unit 12, and an image restoring start 1705 to the restoration controlling unit 13. The sequential controlling unit 10 receives an entropy decoding end 1702 from the decode controlling unit 11, an image transforming end 1704 from the transform controlling unit. 12, and an image restoring end 1706 from the restoration controlling unit 13. The control by the sequential controlling unit 10 is described in detail later. The sequential controlling unit 10 also transfers information between the image decode process, image transform process and image restoration process. More specifically, on receiving the motion vector error 1604 from the restoration controlling unit 13, the sequential controlling unit 10 transfers it to the decode controlling unit 11. On receiving the coding error 1602, out-of-range error 1603, macroblock pattern identifier 1624, motion vector 1625, picture coding type 1623, or macroblock type 1628 from the decode controlling unit 11, the sequential controlling unit 10 transfers it to the restoration controlling unit 13. Each of these data transfers is synchronized with a corresponding block.

2.1.8 Information Storage Unit 10a

The information storage unit 10a stores a motion vector 1625, picture coding type 1623, macroblock type 1628, macroblock pattern identifier 1624, coding error 1602, out-of-range error 1603, and motion vector error 1604 for each block to be processed.

2.1.9 Bitstream Analyzing Unit 11a

The bitstream analyzing unit 11a analyzes a bitstream after it receives a bitstream analysis start 1711 from the decode controlling unit 11.

2.1.10 Entropy Decoding Unit 11b

The entropy decoding unit 11b sends an entropy decoding end 1702 to the decode controlling unit 11 after a block is decoded.

2.1.11 Decode Controlling Unit 11

The decode controlling unit 11 controls the bitstream analyzing unit 11a, entropy decoding unit 11b, second constant generating unit 11c, and second selecting unit 11d. The decode controlling unit 11 also transfers information between the sequential controlling unit 10, bitstream analyzing unit 11a, entropy decoding unit 11b, second constant generating unit 11c, and second selecting unit 11d. More specifically, on receiving the entropy decoding start 1701, the decode controlling unit 11 sends the bitstream analysis start 1711 to the bitstream analyzing unit 11a; on receiving the entropy decoding end 1702 from the entropy decoding unit 11b, the decode controlling unit 11 transfers it to the sequential controlling unit 10. The decode controlling unit 11 also sends the coding error 1602, out-of-range error 1603, motion vector 1625, picture coding type 1623, macroblock type 1628, or macroblock pattern identifier 1624 to the sequential controlling unit 10. The decode controlling unit 11 also transfers the motion vector error 1604 from the sequential controlling unit 10 to the bitstream analyzing unit 11a.

2.1.12 Second Selecting Unit 11d

The second selecting unit 11d receives data from the entropy decoding unit 11b and second constant generating unit 11c and output the data to the second image storage unit 15.

2.1.13 Dequantization Unit 12a

On receiving the image transforming start 1703 from the transform controlling unit 12, the dequantization unit 12a starts the dequantization on the data stored in the second image storage unit 15.

2.1.14 IDCT Unit 12b

The IDCT unit 12b performs IDCT on the data output from the dequantization unit 12a to generate a unit image, and outputs the generated unit image to the third image storage unit 16. The IDCT unit 12b outputs the image transforming end 1704 to the transform controlling unit 12 after outputting the unit image to the third image storage unit 16.

2.1.15 Image Restoring Unit 13c

On detecting a motion vector error, the image restoring unit 13c sends the motion vector error 1604 to the restoration controlling unit 13.

2.2 Data Flow in Image Decoding Apparatus

The data flow in the image decoding apparatus constructed as shown in FIG. 11 is described with reference to FIGS. 12–15.

The motion vector error 1604 and the entropy decoding start 1701 are output from the sequential controlling unit 10 to the decode controlling unit 11.

The coding error 1602, out-of-range error 1603, motion vector 1625, picture coding type 1623, macroblock type 1628, macroblock pattern identifier 1624, and entropy decoding end 1702 are output from the decode controlling unit 11 to the sequential controlling unit 10.

The image transforming start 1703 is output from the sequential controlling unit 10 to the transform controlling unit 12.

The image transforming end 1704 is output from the transform controlling unit 12 to the sequential controlling unit 10.

The image restoring start 1705, motion vector 1625, picture coding type 1623, macroblock type 1628, coding error 1602, out of range error 1603, and macroblock pattern identifier 1624 are output from the sequential controlling unit 10 to the restoration controlling unit 13.

The image restoring end 1706 and motion vector error 1604 are output from the restoration controlling unit 13 to the sequential controlling unit 10.

The coding error 1602, out-of-range error 1603, motion vector error 1604, bitstream analysis start 1711 are output from the decode controlling unit 11 to the bitstream analyzing unit 11a.

The entropy decoding end 1702, run length 1621, coding, error 1602, picture coding type 1623, macroblock type 1628, macroblock pattern identifier 1624, and motion vector 1625 are output from the entropy decoding unit 11b to the decode controlling unit 11.

The coded picture coding type 1611, coded macroblock type 1615, coded motion vector 1612, coded quantized DCT coefficient 1613, coded macroblock pattern identifier 1614 are output from the bitstream analyzing unit 11a to the entropy decoding unit 11b.

The effectiveness factors 1631 in output from the entropy decoding unit 11b to the second selecting unit 11d.

The run lengths 1621 and the effectiveness factors 1631 are output from the decode controlling unit 11 to the second selecting unit 11d.

The quantized DCT coefficient 1641 is output from the second selecting unit 11d to the second image storage unit 15.

The quantized DCT coefficient 1641 is output from the second image storage unit 15 to the dequantization unit 12a.

The image transforming start 1703 is output from the transform controlling unit 12 to the dequantization unit 12a.

The image transforming end 1704 is output from the IDCT unit 12b to the transform controlling unit 12.

The restoration unit in 1661 is output from the IDCT unit 12b to the third image storage unit 16.

The restoration unit image 1661 is output from the third image storage unit 16 to the first selecting unit 13b.

The "constant 0" 1662 is output from the first constant generating unit 13a to the first selecting unit 13b.

The selection instruction 1712 is output from the restoration controlling unit 13 to the first selecting unit 13b.

The integrated unit image 1663 being a combination of the restoration unit image 1661 and the "constant 0" 1662 is output from the first selecting unit 13b to the image restoring unit 13c.

The image restoring unit 1706 and the motion vector error 1604 are output from the image restoring unit 13c to the restoration controlling unit 13.

The motion vector 1625, picture coding type 1623, macroblock type 1628, coding error 1602, and out-of-range error 1603 are output from the restoration controlling unit 13 to the image restoring unit 13c.

The reference unit image 1686 is output from the first image storage unit 14 to the image restoring unit 13c.

The synthesized unit image 1687 is output from the image restoring unit 13c to the first image storage unit 14.

Figure 16:
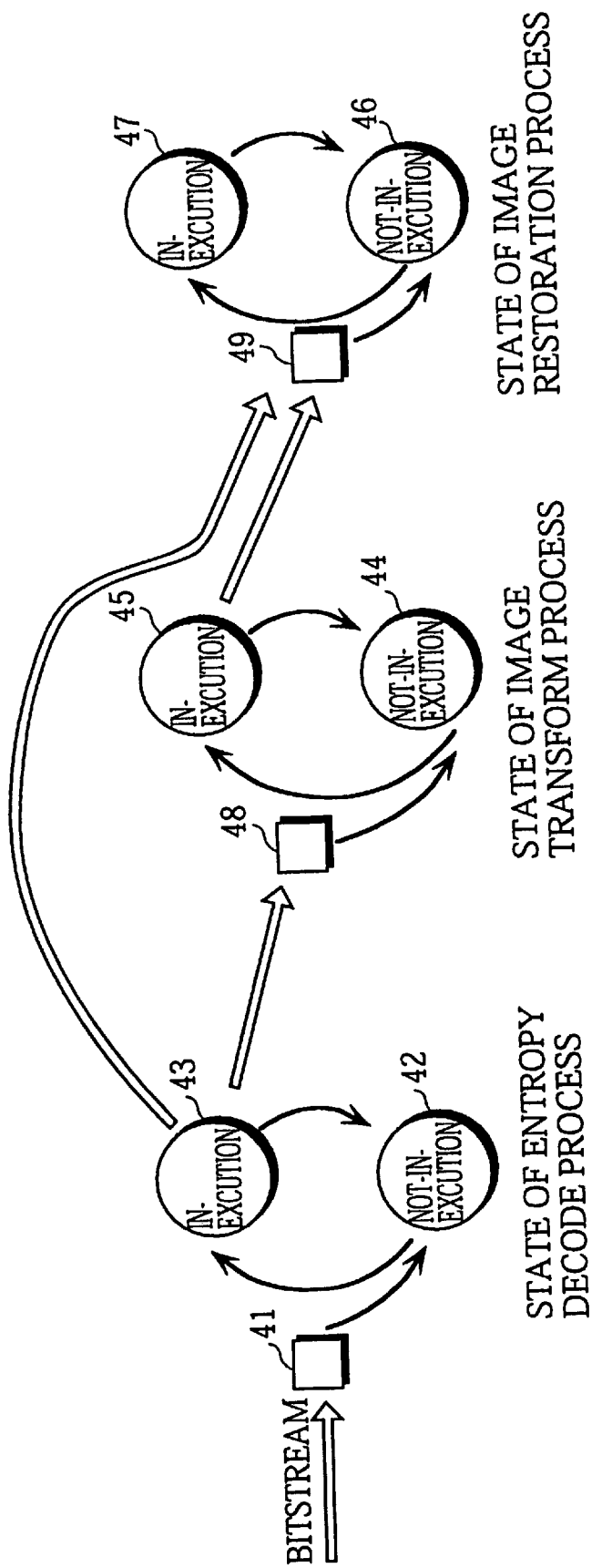
FIG. 16 shows the change of state in the entropy decode process, image transform process, and image restoration process of the image decoding apparatus shown in FIG. 11.

2.3 Change of State in Entropy Decode Process, Image Transform Process, Image Restoration Process The change of state in the entropy decode process, image transform process, and image restoration process of the image decoding apparatus constructed as shown in FIG. 11 is described with reference to FIG. 16.

The entropy decode process is in either of not-in-execution state 42 and in-execution state 43.

The entropy decode process can be executed on a bitstream 41 when the entropy decode process is in not-in-execution state 42. The entropy decode process is in in-execution state 43 during the execution on a bitstream 41. After the entropy decode process on a bitstream 41 is finished, the entropy decode process returns to the not-in-execution state 42.

The image transform process is in either of not-in-execution state 44 and in-execution state 45.

The image transform process can be executed on data 48 when the image transform process is in not-in-execution state 44. The image transform process is in the in-execution state 45 during the execution on data 48. After the image transform process on data 48 is finished, the image transform process returns to the not-in-execution state 44.

The image restoration process is in either of not-in-execution state 46 and in-execution state 47.

The image restoration process can be executed on data 49 when the image restoration process is in not-in-execution state 46. The image restoration process is in the in-execution state 47 during the execution on data 49. After the image restoration process on data 49 is finished, the image restoration process returns to the not-in-execution state 46.

2.4 Operation of Sequential Controlling Unit

The operation of the sequential controlling unit 10 of the image decoding apparatus constructed as shown in FIG. 11 is described with reference to the flowcharts shown in FIGS. 17, 18, and 19.

Figure 17:
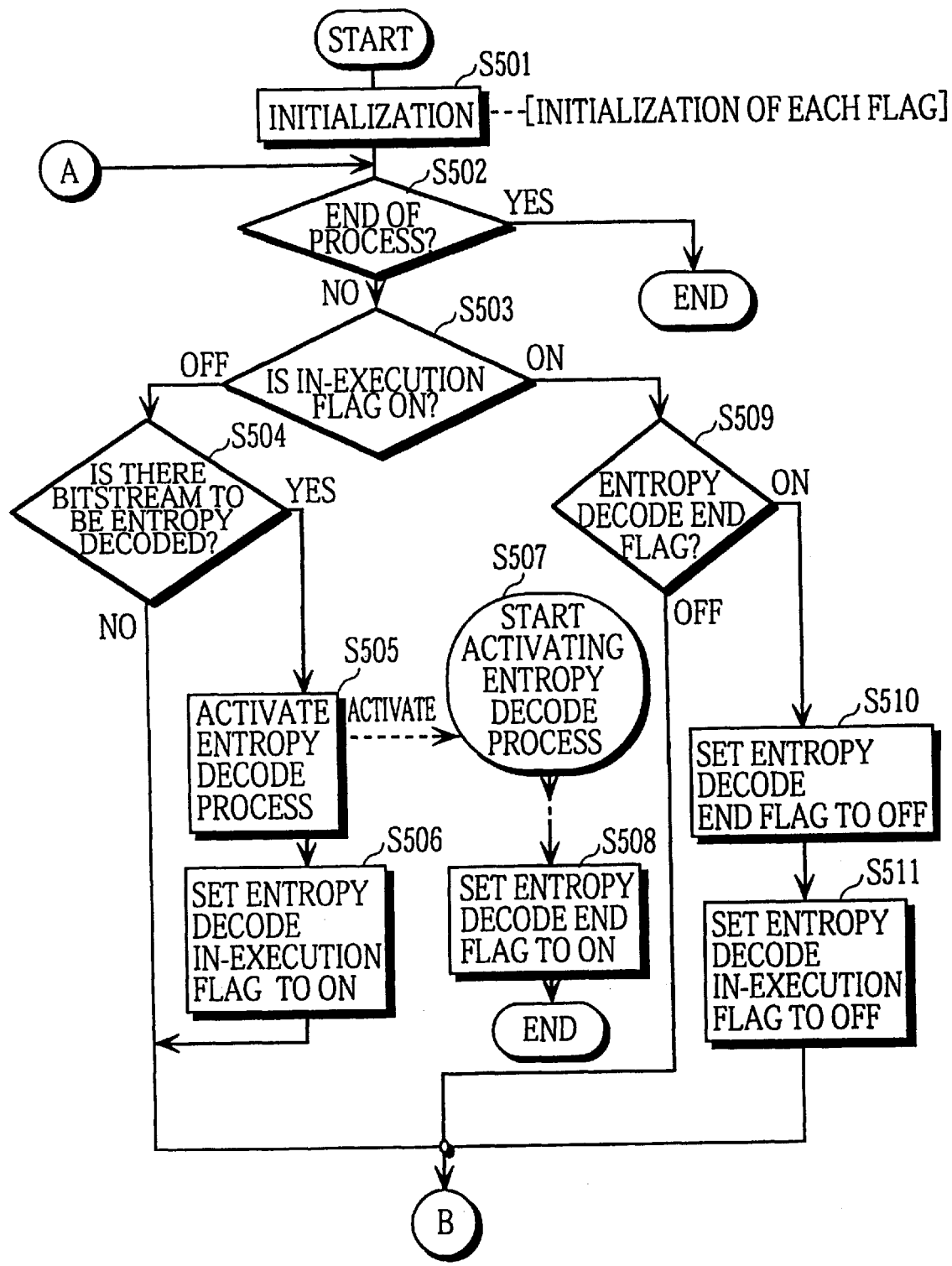
FIG. 17 is a flowchart showing the operation of the sequential controlling unit of the image decoding apparatus shown in FIG. 11.

In FIG. 17, the sequential controlling unit 10 initializes flags (step S501). More specifically, the sequential controlling unit 10 sets each of an entropy decode in-execution flag, an entropy decode end flag, an image transform in-execution flag, an image transform end flag, an image restoration in-execution flag, and an image restoration end flag to an initial value, namely to ON or OFF state.

The sequential controlling unit 10 judges whether to end the current process by checking to see if the sequential controlling unit 10 has received the image restoration end 1706 from the restoration controlling unit 13 which corresponds to the bitstream end code detected by the bitstream analyzing unit 11a (S502). If It is judged that the process should end in S502, the sequential controlling unit 10 ends the control on decode controlling unit 11, transform controlling unit 12, and restoration controlling unit 13.

When it is judged in S502 that the process should be continued, the sequential controlling unit 10 checks the entropy decode in-execution flag (S503). When the flag is OFF, the sequential controlling unit 10 judges whether there is a bitstream on which the entropy decode should be executed (S504). When there is such a bitstream, the sequential controlling unit 10 instructs the decode controlling unit 11 to activate the entropy decode process (S505), then sets the entropy decode in-execution flag to ON (S506) and continues processing. The decode controlling unit 11 activates the entropy decode process (S507). When the process is finished, the decode controlling unit 11 notifies the sequential controlling unit 10 of the end of the process. On receiving the notification, the sequential controlling unit 10 sets the entropy decode end flag to ON (S508).

When it is judged in S504 that there is no bitstream on which the entropy decode should be executed, the sequential controlling unit 10 continues processing.

When it is judged in S503 that the entropy decode in execution flag is ON, indicating the entropy decode process being currently executed, the sequential controlling unit 10 checks the entropy decode end flag (S509). When the flag is ON, indicating the entropy decode process having been finished, the sequential controlling unit 10 sets the entropy decode end flag to OFF (S510), then sets the entropy decode in execution flag to OFF (S511) to continue processing.

When it is judged in step S509 that the entropy decode end flag is OFF, indicating the entropy decode process having not been finished, the sequential controlling unit 10 continues processing.

Figure 18:
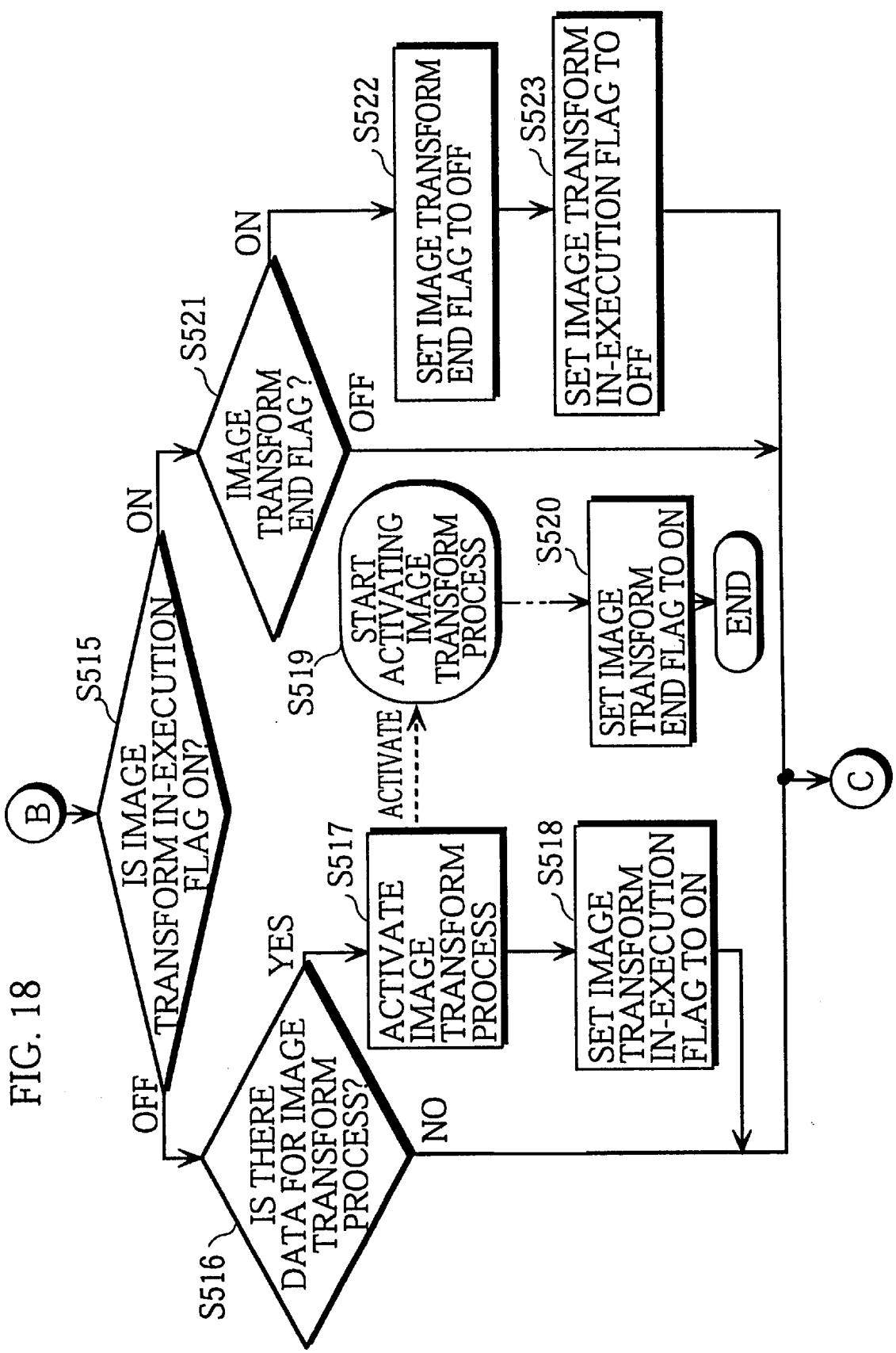
FIG. 18 is a flowchart showing the operation of the sequential controlling unit of the image decoding apparatus shown in FIG. 11, continued from FIG. 17.

In FIG. 18, the sequential controlling unit 10 checks the image transform in-execution flag (S515). When the flag is OFF, indicating the image transform process being not currently executed, the sequential controlling unit 10 judges whether there is data on which the image transform process should be executed (S516). When there is such data, the sequential controlling unit 10 instructs the transform controlling unit 12 to activate the image transform process (S517). The sequential controlling unit 10 then sets the image transform in-execution flag to ON (S518). The transform controlling unit 12 activates the image transform process (S519). When the process is finished, the transform controlling unit 12 notifies the sequential controlling unit 10 of the end of the process. On receiving the notification, the equal controlling unit 10 sets the image transform end flag to ON (S520).

When it is judged in S526 that there is no data on which the image transform process should be executed, the sequential controlling unit 10 continues process.

When it is judged in S515 that the image transform in-execution flag is ON, indicating the image transform process being currently executed, the sequential controlling unit 10 checks the image transform end flag (S521). When the flag is ON, indicating the image transform process having been finished, the sequential controlling unit 10 sets the image transform end flag to OFF (S522), then sets the image transform in-execution flag to OFF (S523) to continue processing.

When it is judged in step S521 that the image transform end flag is OFF, indicating the image transform process having not been finished, the sequential controlling unit 10 continues processing.

Figure 19:
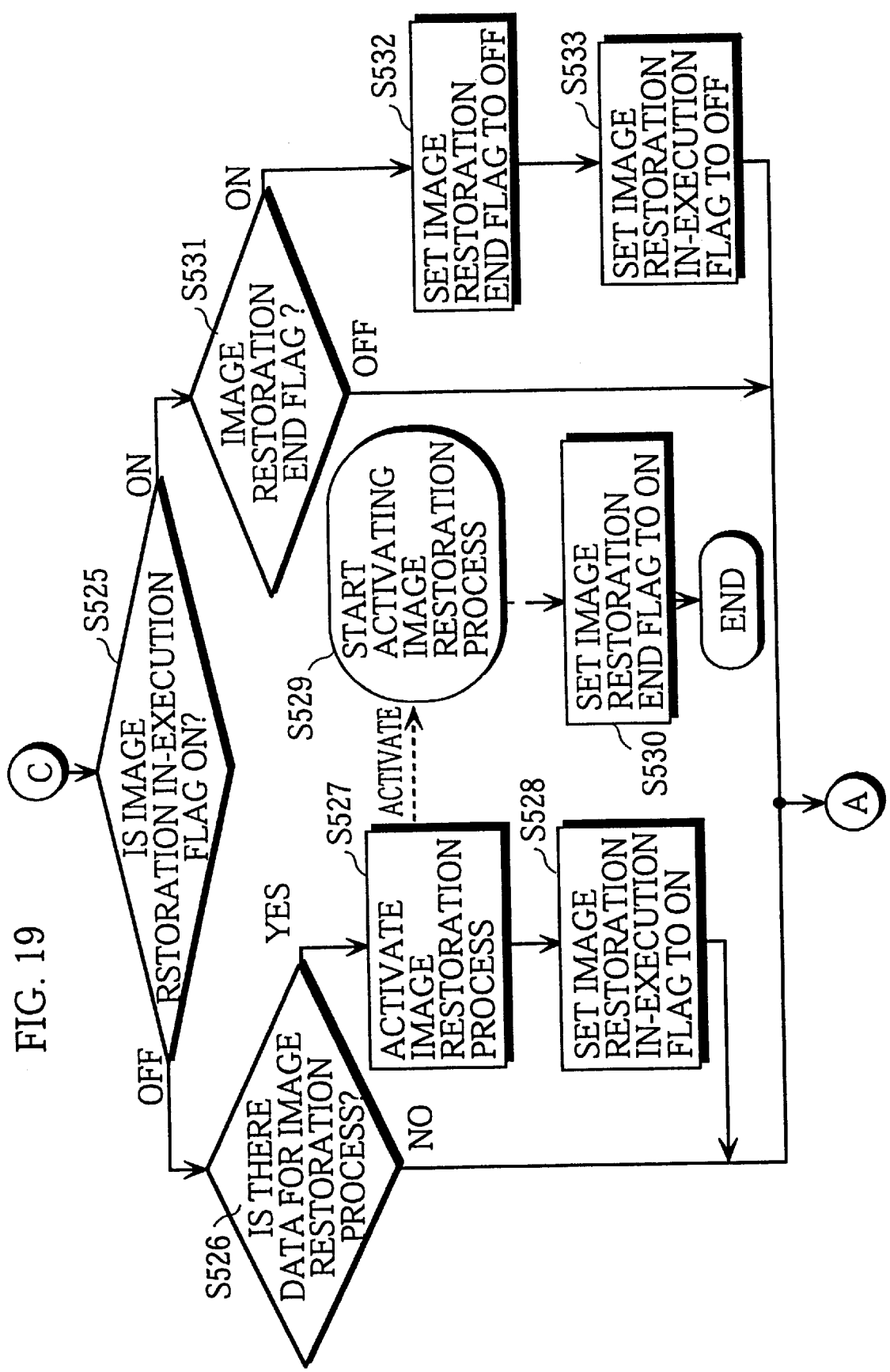
FIG. 19 is a flowchart showing the operation of the sequential controlling unit of the image decoding apparatus shown in FIG. 11, continued from FIG. 18.

In FIG. 19, the sequential controlling unit 10 checks the image restoration in-execution flag (S525). When the flag is OFF, indicating the image restoration process being not currently executed, the sequential controlling unit 10 judges whether there is data on which the image restoration process should be executed (S526). When there is such data, the sequential controlling unit 10 instructs the restoration controlling unit 13 to activate the image restoration process (S527). The sequential controlling unit 10 then sets the image restoration in-execution flag to ON (S528). The restoration controlling unit 13 activates the image restoration process (S529). When the process is finished, the restoration controlling unit 13 notifies the sequential controlling unit 10 of the end of the process. On receiving the notification, the sequential controlling unit 10 sets the image restoration end flag to ON (S530).

When it is judged in S526 that there is no data on which the image restoration process should be executed, the sequential controlling unit 10 continues processing.

When it is judged in S525 that the image restoration in-execution flag is ON, indicating the image restoration process being currently executed, the sequential controlling unit 10 checks the image restoration end flag (S531). When the flag is ON, indicating the image restoration process having been finished, the sequential controlling unit 10 sets the image restoration end flag to OFF (S532), then sets the image restoration in-execution flag to OFF (S533) to continue processing.

When it is judged in step S531 that the image restoration end flag is OFF indicating the image restoration process having not been finished, the sequential controlling unit 10 continues processing.

The sequential controlling unit 10 then returns to step S502 and continues processing.

As described above, the sequential controlling unit 10 activates the entropy decode process only when conditions for executing the process are satisfied, and controls the process so that the process is not repeated. Accordingly, a block is executed only after the preceding block has been executed. This is the same with the image transform process and the image restoration process.

2.5 Process Change with Time

Figure 20:
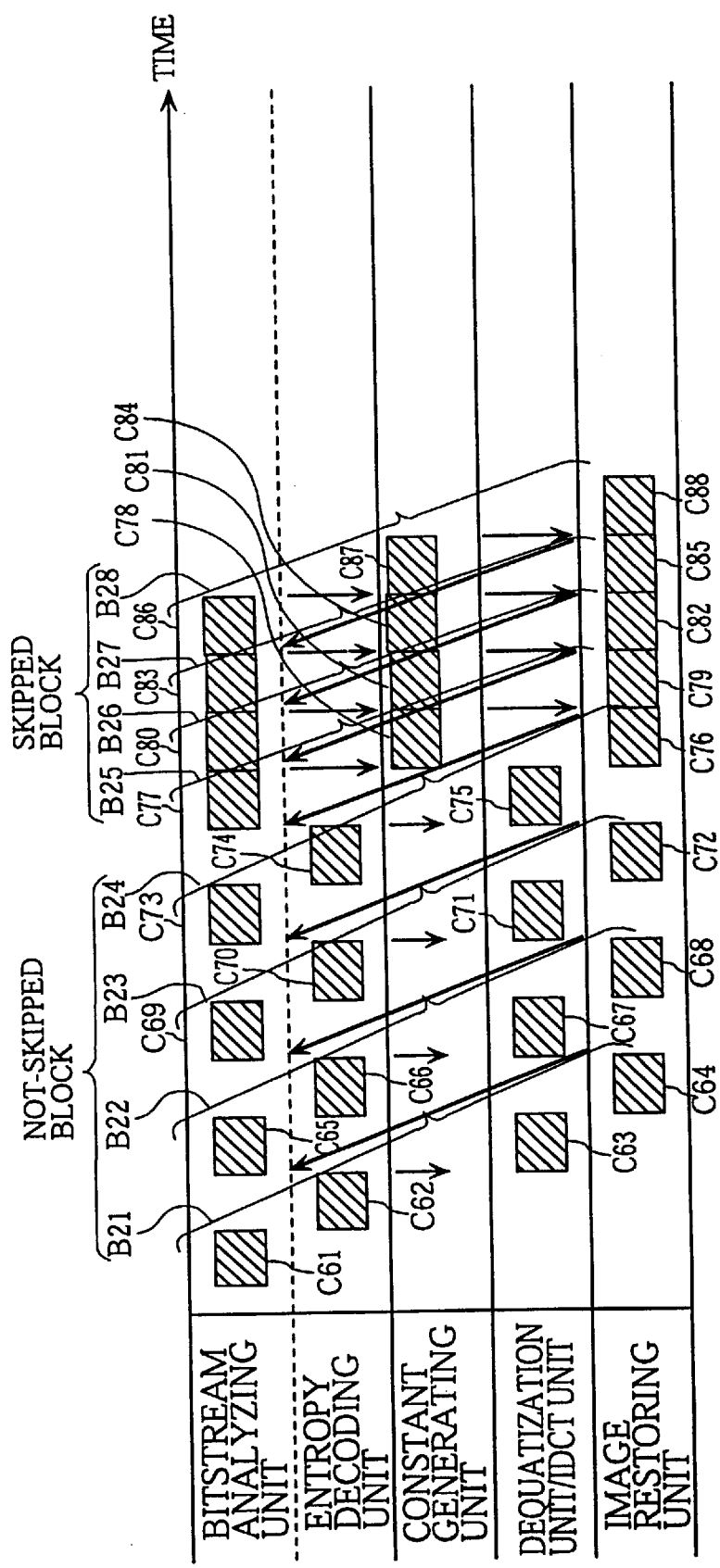
FIG. 20 is a time chart showing change with time in the processes performed by the image decoding apparatus shown in FIG. 11.

FIG. 20 shows the change with time in the processes performed by the image decoding apparatus constructed as shown in FIG. 11 for each block. The drawing lists the bitstream analyzing unit 11*a*, entropy decoding unit 11*b*, first constant generating unit 13*a*, a combination of dequantization unit 12*a* and IDCT unit 12*b*, and image restoring unit 13*c* to show blocks processed by these units in time sequence. Each block is handled by these units in this order. The blocks are divided into "skipped blocks" and "not-skipped blocks." "Not-skipped blocks" B21–B24 and "skipped blocks" B25–B28 are processed in this order. C61–C64, C65–C68, C69–C72, C73–C76, C77–C79, C80–C82, C83–C85, and C86–C88 represent sets of processes respectively performed for blocks B21, B22, B23, B24, B25, B26, B27, and B28.

As shown in the drawing, C61–C64 are processed in this order in sequence; C65–C68 are processed in this order in sequence. Of these, C63 and C65 are processed simultaneously.

As apparent from the drawing, the image decoding apparatus of the present embodiment processes the blocks with less time than that of the first embodiment since the present apparatus processes a plurality of blocks simultaneously.

3. Third Embodiment

The image compensation at an error detection handled by the image restoring unit 119 in the first embodiment is described here in detail as the third embodiment.

Note that the present embodiment can also be achieved by the image restoring unit 13*c* in the second embodiment.

3.1 Construction of Image Decoding Apparatus

The image decoding apparatus of the third embodiment has the same construction as that of the first embodiment. The features unique to the present embodiment are described below.

Figure 21:
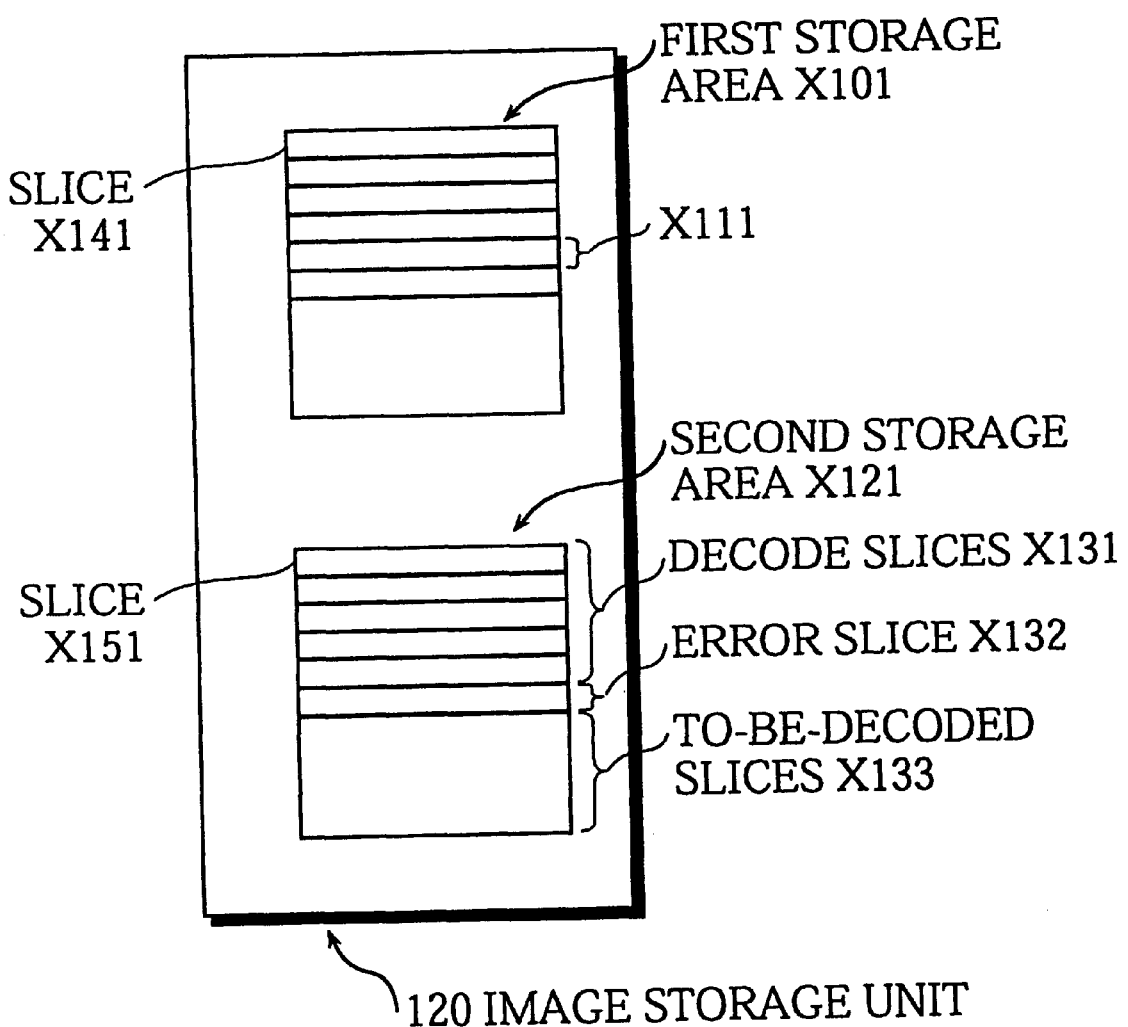
FIG. 21 is a block diagram showing a construction of the image storage unit of the image decoding apparatus of the third embodiment.

As shown in FIG. 21, the image storage unit 120 includes a first storage area X101 and a second storage area X121 which each alternately store a currently decoded frame picture 1692 and the preceding frame picture (reference frame picture 1691).

FIG. 21 shows a state where the first storage area X101 stores a frame preceding a currently decoded frame and the second storage area X121 stores the currently decoded frame.

The frame in the second storage area X121 includes a plurality of slices X151 which are divided into decoded slices X131, an error slice X132 in which an error has occurred during decoding, and to-be-decoded slices X133.

The decoded frame in the first storage area X101 includes a plurality or slices X141. A slice X111 in the slices X141 corresponds to the error slice X132 in the currently decoded frame. That is, when the slice X111 is the "n"th slice among the slices 141, the slice X132 is also the "n"th slice among the slices 151, where "n" is an integer greater than 0.

Figure 22:
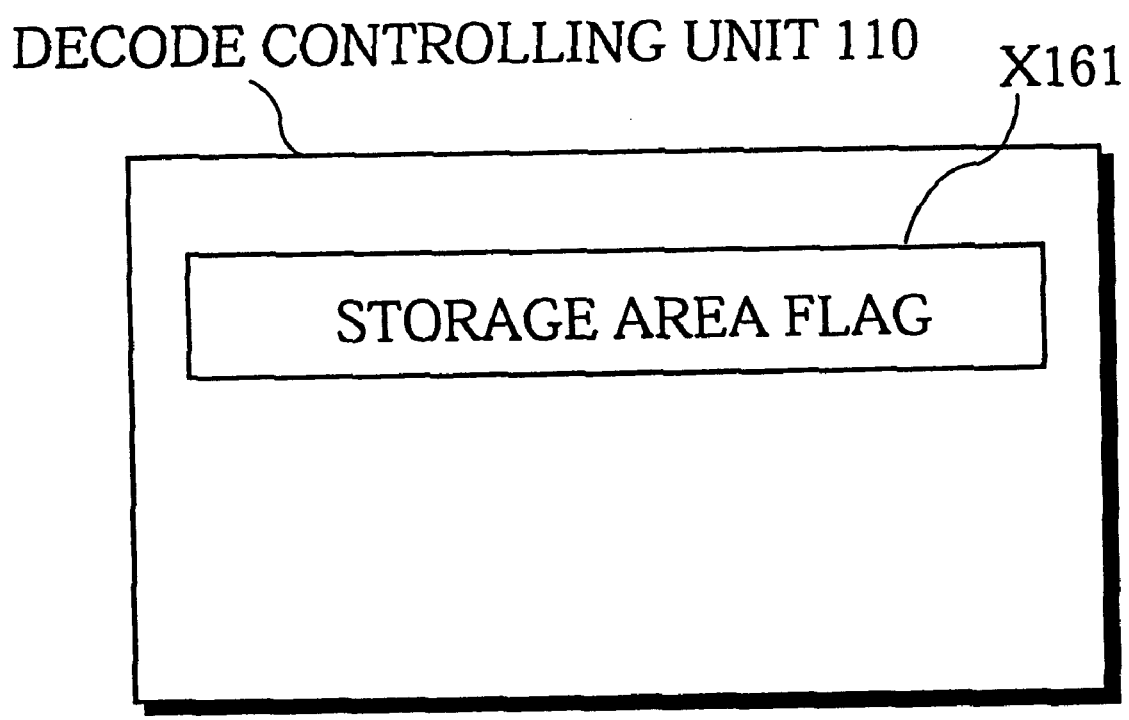
FIG. 22 shows a storage area flag set in the decode controlling unit of the image decoding apparatus in the third embodiment.

As shown in FIG. 22, the decode controlling unit 110 includes a storage area flag X161. The storage area flag X161 set to "1" indicates that the first storage area X101 stores a frame preceding a currently decoded frame and that the second storage area X121 stores the currently decoded frame. The storage area flag X161 set to "0" indicates that the first storage area X101 stores a currently decoded frame and that the second storage area X121 stores a frame preceding the currently decoded frame.

The decode controlling unit 110 sets the storage area flag X161 to "1" during an initialization which is performed immediately after the image decoding apparatus is activated and before the bitstream analysis starts.

Before a frame starts being decoded, the decode controlling unit 110 instructs the image restoring unit 119 to make space in either the first storage area X101 or the second storage area X121 so that the frame is stored in it as the frame is decoded.

The decode controlling unit 110 switches the value in the storage area flag X161 from "0" to "1," or vice versa, after one frame has been decoded.

When an error occurs during decoding of a frame, the image restoring unit 119 reads out slice X111 from the decoded frame in the first storage area X101 preceding the current frame and writes the read-out slice X111 into the error slice X132 in the currently decoded frame in the second storage area X121.

On receiving an instruction from the decode controlling unit 110, the image restoring unit 119 makes space in either the first storage area X101 or the second storage area X121 in accordance with the specification by the storage area flag X161 for a frame to be decoded.

3.2 Operation of Image Decoding Apparatus

Figure 23:
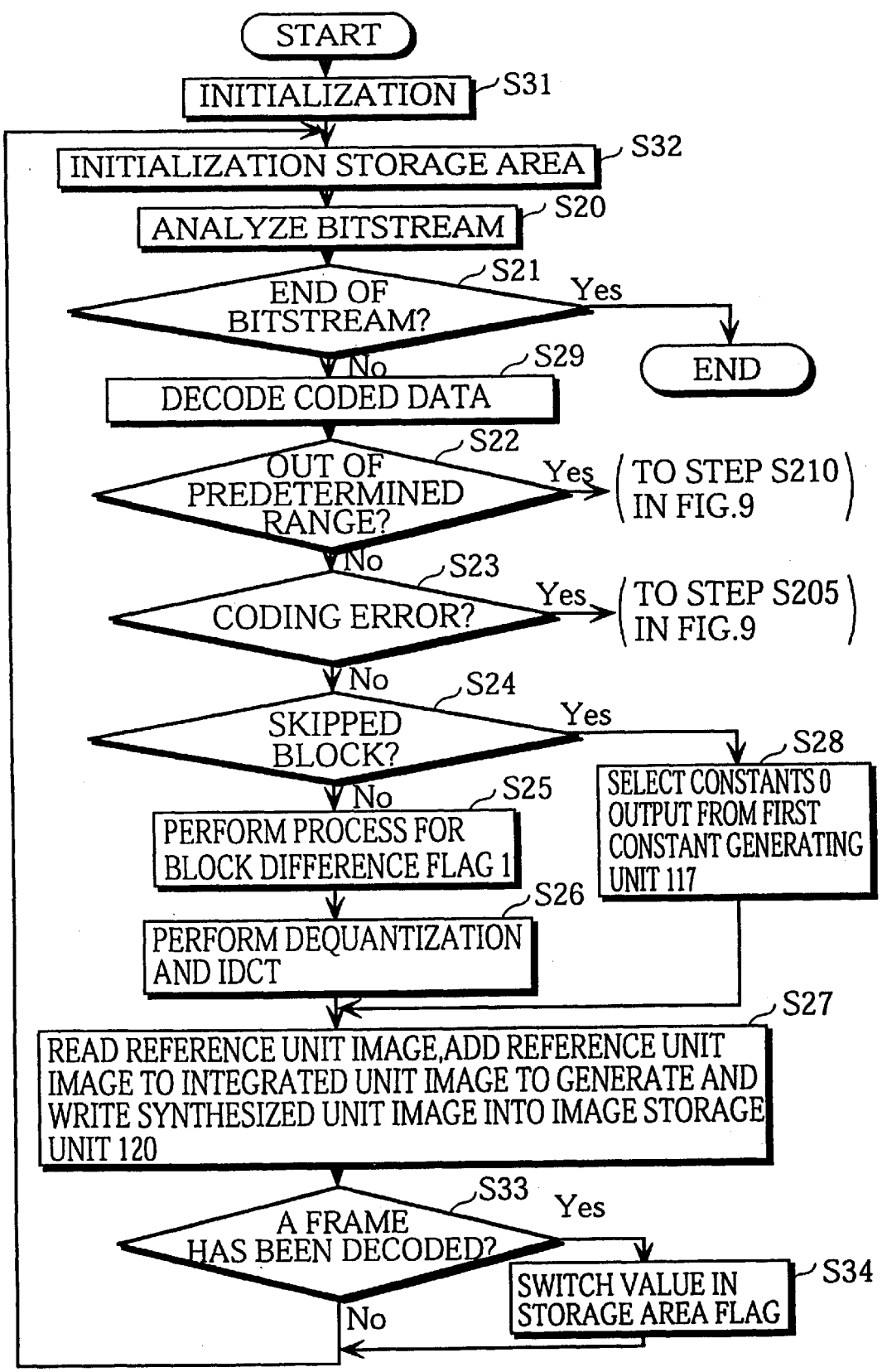
FIG. 23 is a flowchart showing the operation of the image decoding apparatus in the third embodiment.

The operation of the image decoding apparatus in the third embodiment is described below with reference to the flowchart shown in FIG. 23. Differences from FIG. 8 are mainly explained here. Compared to FIG. 8, the flowchart of FIG. 23 additionally includes steps S31 to S34.

In step S31, the decode controlling unit 110 sets the storage area flag X161 to "1" during an initialization which is performed immediately after the image decoding apparatus is activated and before the bitstream analysis starts.

In S32, the decode controlling unit 110 instructs the image restoring unit 119 to make space in either the first storage area X101 or the second storage area X121. On receiving the instruction from the decode controlling unit 110, the image restoring unit 119 makes space in either the first storage area X101 or the second storage area X121 in accordance with the specification by the storage area flag X161 for a frame to be decoded.

In S33, the decode controlling unit 110 judges whether a frame has been decoded. When the frame has been decoded, the decode controlling unit 110 switches the value in the storage area flag X161 from "0" to "1," or vice versa, in S34. Control then goes to S20.

Figure 24:
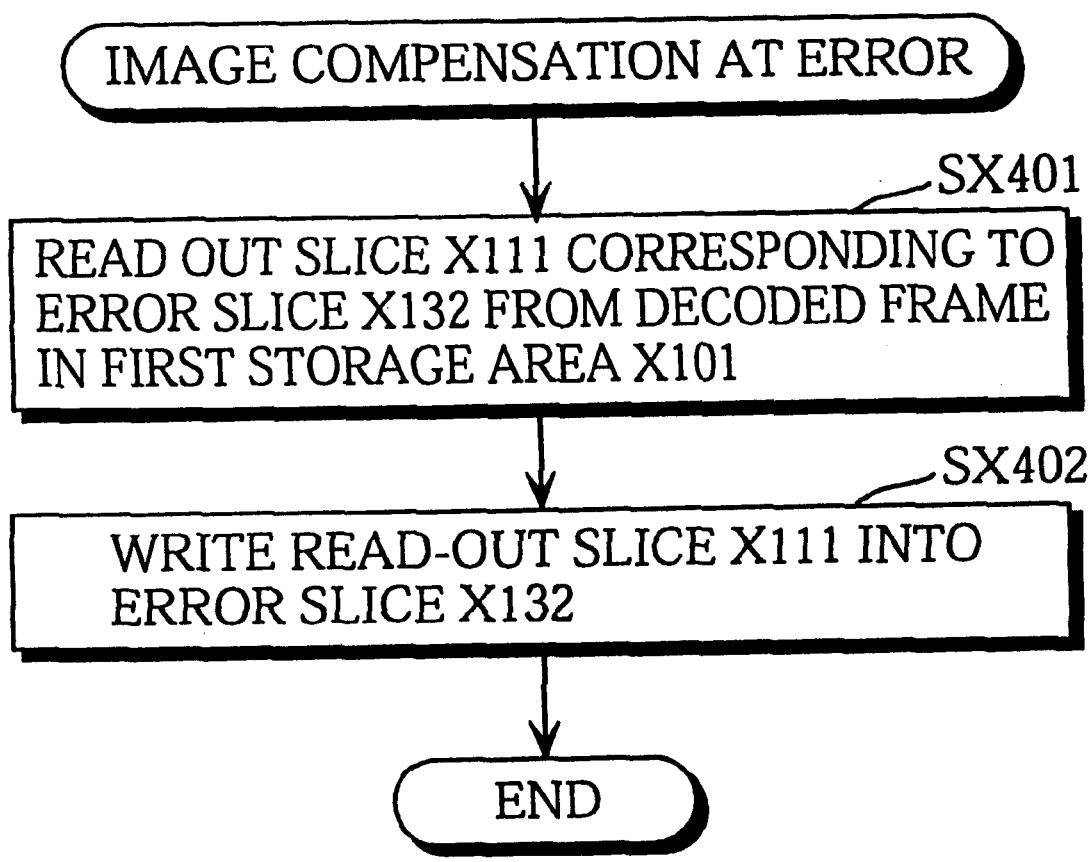
FIG. 24 is a flowchart showing a procedure of the image compensation process at an error detection by the image decoding apparatus in the third embodiment.

FIG. 24 is a flowchart showing a detailed procedure of the image compensation process at an error detection.

When an error occurs during decoding of a frame, the image restoring unit 119 reads out slice X111 from the decoded frame in the first storage area X101 preceding the current frame (SX401), and writes the read-out slice X111 into the error slice X132 in the currently decoded frame in the second storage area X121 (SX402).

4. Fourth Embodiment

Another image compensation at an error detection handled by the image restoring unit 119 in the first embodiment is described here in detail as the fourth embodiment.

Note that the present embodiment can also be achieved by the image restoring unit 13c in the second embodiment.

4.1 Construction of Image Decoding Apparatus

The image decoding apparatus of the fourth embodiment has the same construction as that of the first embodiment. The features unique to the present embodiment are described below.

Figure 25:
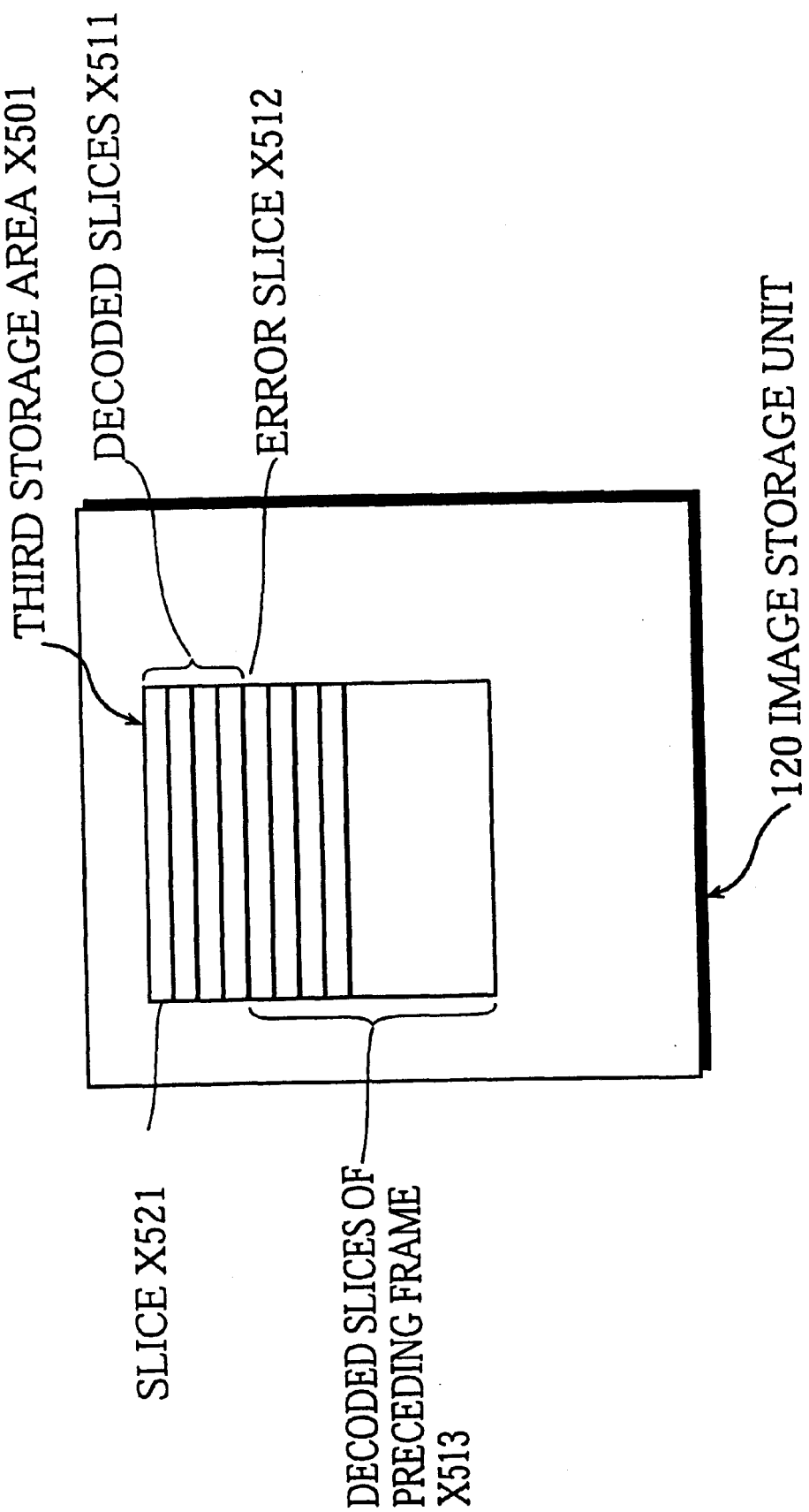
FIG. 25 is a block diagram showing a construction of the image storage unit of the image decoding apparatus of the fourth embodiment.

As shown in FIG. 25, the image storage unit 120 includes a third storage area X501 which stores a currently decoded frame 1692. The third storage area X501 includes a plurality of slices X521.

Writing of a decoded frame into the third storage areas X501 by the image restoring unit 119 is described in detail below.

Suppose now a frame has been decoded and decoding of the next frame will soon be started.

First, the image restoring unit 119 writes the whole decoded frame into the third storage area X501.

Then, as the next frame is decoded, the image restoring unit 119 writes the frame slice by slice over the preceding frame at the corresponding slices in the third storage area X501. When an error occurs during decoding of "n"th slice, the image restoring unit 119 skips writing of the "n"th slice into the third storage area X501. That is, the image restoring unit 119 leaves the slice in the preceding frame corresponding to the error frame, as it is in the current frame. FIG. 25 shows the slices X521 which are divided into decoded slices X511 of the currently decoded frame, the error slice X512, and decoded slices X513 of the preceding frame. The image restoring unit 119 resumes writing the current frame slice by slice over the preceding frame starting from the "n+1" slice. With this arrangement, the error slice is replaced by a slice of the preceding frame corresponding to the error slice.

4.2 Operation of Image Decoding Apparatus

Figure 26:
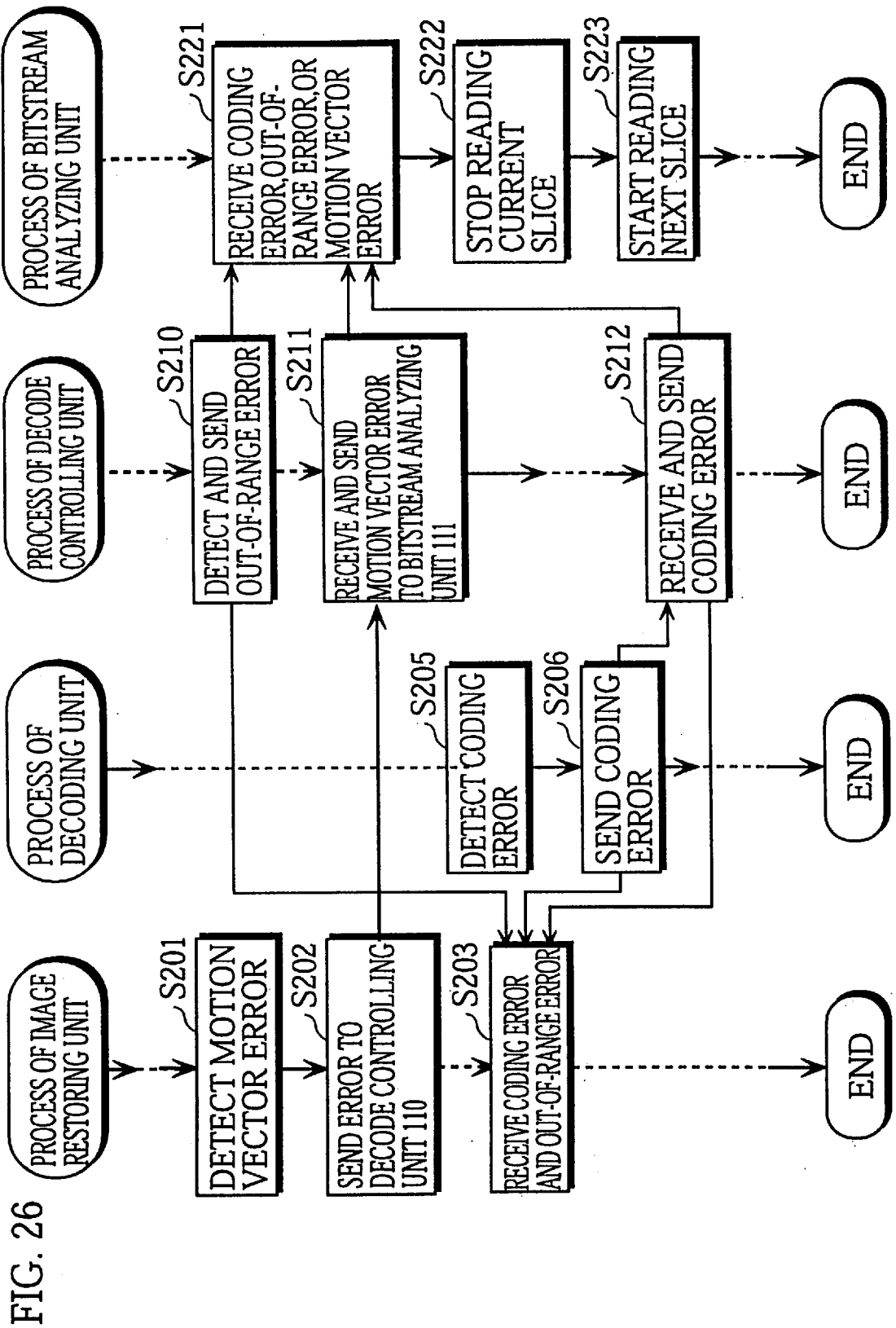
FIG. 26 is a flowchart showing the error handling processes of the image decoding apparatus in the fourth embodiment.

The operation of the image decoding apparatus in the fourth embodiment is described below with reference to the flowchart shown in FIG. 26. Differences from FIG. 8 are mainly explained here. Compared to FIG. 8, the flowchart of FIG. 26 lacks step S204. That is to say, when an error occurs during decoding of slice X512, the image restoring unit 119 does not write the slice X512 into the third storage area X501.

With the above arrangement, error slices are replaced by slices of a preceding frame corresponding to the error slices.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image decoding apparatus for decoding coded data to generate moving pictures, the image decoding apparatus comprising:

extracting means for extracting a coded unit image from the coded data, wherein the coded unit image includes difference information which indicates whether an original unit image of the coded unit image is equal to a reference unit image which is a part of a frame picture having been decoded, and, during a predictive coding process, the original unit image is transformed into the coded unit image which includes difference values between pixel values of the original unit image and pixel values of the reference unit image when the difference information indicates that the original unit image is different from the reference unit image, wherein the coded unit image including the difference values is also called a coded difference unit image, the original unit image and the reference unit image each having a same, predetermined number of pixels;

difference decoding means for decoding the coded difference unit image including the difference values to generate a difference unit image;

preventing means for preventing the difference decoding means from generating the difference unit image when the extracted difference information indicates that the original unit image of the coded unit image is equal to the reference unit image;

first constant generating means for generating a first constant image which is composed of constants "0";

first image selecting means for selecting the first constant image when the difference information indicates that the original unit image is equal to the reference unit image and selecting the difference unit image when the difference information indicates that the original unit image is different from the reference unit image; and image restoring means for restoring the original unit image by adding a result selected by the first image selecting means to the reference unit image.

2. The image decoding apparatus of claim 1, wherein the first constant generating means includes:

a first constant generating sub unit for generating one constant "0"; and a first constant controlling sub-unit for instructing the first constant generating sub-unit to generate as many constants "0" as the predetermined number of pixels in the original unit image and generating the first constant image being composed of the predetermined number of constants "0."

3. The image decoding apparatus of claim 1, wherein the first constant generating means generates one constant "0" as the first constant image, and the first image selecting means selects the constant "0" generated by the first constant generating means as many times as the predetermined number of pixels in the original unit image when the difference information indicates that the original unit image is equal to the reference unit image, and the image restoring means restores the original unit image by adding the predetermined number of constants "0" selected by the first image selecting means to the reference until image when the difference information indicates that the original unit image is equal to the reference unit image.

4. The image decoding apparatus of claim 1, wherein the first constant generating means generates a plurality of constants "0" as the first constant image, and the first image selecting means selects the plurality of constants "0" generated by the first constant generating means a predetermined number of times so that the same number of constants "0" as the predetermined number of pixels in the original unit image are selected when the difference information indicates that the original unit image is equal to the reference unit image, and the image restoring means restores the original unit image by adding the constants "0" selected by the first image selecting means to the reference unit image when the difference information indicates that the original unit image is equal to the reference unit image.

5. The image decoding apparatus of claim 1, wherein the difference decoding means includes:

effectiveness factor generating means for decoding the coded difference unit image to generate one or more pairs of an effectiveness factor and a run length;

second constant generating means for generating constants "0, " wherein the constants "0" generated by the second constant generating means are called second constants;

second image selecting means for selecting as many second constants as specified by the run lengths generated by the effectiveness factor generating means and generating a coefficient sequence by combining the selected second constants with the effectiveness factors generated by the effectiveness factor generating means;

dequantization means for executing a dequantization on the coefficient sequence to generate an orthogonal transformation coefficient sequence; and conversion means for executing an inverse orthogonal transformation on the orthogonal transformation coefficient sequence to generate the difference unit image.

6. The image decoding apparatus of claim 5, wherein the inverse orthogonal transformation executed by the conversion means is an inverse Discrete Cosine Transform.

7. The image decoding apparatus of claim 6, wherein the image restoring means includes:

image storage means for storing one or more reference frame pictures having been decoded and a first frame picture which is a currently decoded frame picture; and partial restoring means for reading a reference unit image from the reference frame pictures stored in the image storage means, restoring the original unit image by adding the unit image selected by the first image selecting means to the read reference unit image, and writing the restored original unit image into the first frame picture stored in the image storage means.

8. The image decoding apparatus of claim 7, wherein the image restoring means includes:

first error detecting means for detecting an out-of-range error which indicates that the coded difference unit image includes a value exceeding a predetermined range, the image decoding apparatus further comprises:

first error controlling means for instructing the image restoring means to stop restoring the coded difference unit image when the first error detecting means detects the out of range error, and the image restoring means further includes:

error image restoring means for generating a replacement unit image using a reference unit image of the reference frame pictures stored in the image storage means and writing the replacement unit image into the first frame picture stored in the image storage means in place of the coded difference unit image when an error is detected.

9. The image decoding apparatus of claim 8, wherein the image restoring means further includes:

second error detecting means for detecting a motion compensation error, wherein the first error controlling means instructs the image restoring means to stop restoring the coded difference unit image when the second error detecting means detects the motion compensation error.

10. The image decoding apparatus of claim 9, wherein the image restoring means further includes:

frame picture copying means for reading a reference frame picture from the image storage means and writing the read reference frame picture into the image storage means as the first frame picture before restoration of the currently decoded frame picture is started, the partial restoring means includes:

unit image restoring means for restoring the original unit image and writing the restored original unit image into the first frame picture stored in the image storage means when both the first error detecting means and the second error detecting means tail to detect an error, and the image restoring means includes:

image write prohibiting means for prohibiting the error image restoring means from writing the replacement unit image into the first frame picture when either of the first error detecting means and the second error detecting means detects an error.

11. The image decoding apparatus of claim 9, wherein the error image restoring means includes:
   image reading means for reading a reference unit image of the reference frame pictures stored in the image storage means when either of the first error detecting means and the second error detecting means detects an error, wherein the read reference unit image, in terms of positioning in frame picture, corresponds to the coded difference unit image from which the error is detected; and
   replacement image writing means for writing the reference unit image read by the image reading means into the first frame picture stored in the image storage means as the replacement unit image.

12. The image decoding apparatus of claim 7, wherein the image restoring means includes:
   second error detecting means for detecting a motion compensation error; and
   error image restoring means for generating a replacement unit image using a reference unit image of the reference frame pictures stored in the image storage means and writing the replacement unit image into the first frame picture stored in the image storage means in place of the coded difference unit image when the second error detecting means detects the motion compensation error, and
the image decoding apparatus further comprises:
   second error controlling means for instructing the image restoring means to stop restoring the coded difference unit image when the second error detecting means detects the motion compensation error.

13. The image decoding apparatus of claim 12, wherein the image restoring means further includes:
   frame picture copying means for reading a reference frame picture from the image storage means and writing the read reference frame picture into the image storage means as the first frame picture before restoration of the currently decoded frame picture is started,
the partial restoring means includes:
   unit image restoring means for restoring the original unit image and writing the restored original unit image into the first frame picture stored in the image storage means when the second error detecting means fails to detect an error, and
the error image restoring means includes:
   image write prohibiting means for prohibiting the error image restoring means from writing the replacement unit image into the first frame picture when the second error detecting means detects an error.

14. The image decoding apparatus of claim 12, wherein the error image restoring means includes:
   image reading means for reading a unit image from a reference unit image of the reference frame pictures stored in the image storage means when the second error detecting means detects an error, wherein the read unit image, in terms of positioning in frame picture, corresponds to the coded difference unit image from which the error is detected; and
   replacement unit image writing image for writing the unit image read by the image reading means into the first frame picture stored in the image storage means as the replacement unit image.

15. The image decoding apparatus of claim 1, wherein the extracting means extracts a predetermined number of coded unit images from the coded data, wherein the predetermined number of coded unit images includes a pattern identifier corresponding to a pattern, wherein the pattern shows a pattern of difference between a predetermined number of original unit images of the predetermined number of coded unit images and a predetermined number of reference unit images so that which original unit image is different from a corresponding reference unit image is recognized, each reference unit image is a part of a frame picture having been decoded, and, during a predictive coding process, the predetermined number of original unit images are transformed into the predetermined number of coded unit images which each include difference values between pixel values of the each original unit image and pixel values of a corresponding reference unit image when the original unit image is different from the reference unit image, wherein coded unit images including the difference values are also called coded difference unit images, and each original unit image and each reference unit image has a same, predetermined number of pixels,
the preventing means includes:
   a preventive pattern table which includes a plurality of patterns and a plurality of patterns identifiers corresponding to the plurality of patterns;
   preventive judging means for judging whether each of the predetermined number of original unit images is different from a corresponding reference unit image by referring to the preventive pattern table to identify the pattern related to the pattern identifier included in the predetermined number of coded unit images; and
   p2 preventive control means for preventing the difference decoding means from generating the difference unit image when the preventive judging means judges that the each original unit image is equal to a corresponding reference unit image,
the first image selecting means includes:
   a pattern table which includes a plurality of patterns and a plurality of pattern identifiers corresponding to the plurality of patterns; and
   judging means for judging whether each of the predetermined number of original unit images is different from a corresponding reference unit image by referring to the pattern table to identify the pattern related to the pattern identifier included in the predetermined number of coded unit images; and
   selecting means for selecting the first constant image for each of the predetermined number of original unit images when the judging means judges that the each original unit image is equal to a corresponding reference unit image, and selecting a corresponding difference unit image when the difference information indicates that the each original unit image is different from a corresponding reference unit image.

16. The image decoding apparatus of claim 15, wherein the first constant generating means generates a third constant image which is composed of as many constants "0" as a number of pixels included in the predetermined number of original unit images,
the judging means further judges whether all of the predetermined number of original unit images are equal to the predetermined number of reference unit images from the pattern identifier and the pattern table, and
the selecting means selects the third constant image generated by the first constant generating means when the judging means judges that all of the predetermined number of original unit images are equal to the predetermined number of reference unit images, the image restoring means includes:
- effectiveness factor generating means for decoding coded difference unit images out of the predetermined number of coded unit images in sequence to generate one or more pairs of an effectiveness factor and a run length for each of the coded difference unit images;
- second constant generating means for generating constants "0" called second constants and for generating as many constants "0," which are called fourth constants, as a number of pixels included in each original unit image,
- second image selecting means, when the judging means judges that not all of the predetermined number of original unit images are equal to the predetermined number of reference unit images, for selecting the fourth constants generated by the second constant generating means for each original unit image being equal to corresponding reference unit image to generate a coefficient sequence composed of the selected fourth constants, and selecting as many second constants as specified by the run lengths generated by the effectiveness factor generating means for each original unit image being different from corresponding reference unit image to generate a coefficient sequence by combining the selected second constants with the effectiveness factors generated by the effectiveness factor generating means;
- dequantization means for executing a dequantization on the coefficient sequence generated by the second image selecting means to generate an orthogonal transformation coefficient sequence; and
- conversion means for executing an inverse orthogonal transformation on the orthogonal transformation coefficient sequence to generate a difference unit image.

17. The image decoding apparatus of claim 7 further comprising:
- first processing means which includes:
  - the extracting means;
  - the effectiveness factor generating means;
  - the second constant generating means; and
  - the second image selecting means;
- first storage means for storing the coefficient sequence generated by the second image selecting means;
- second processing means which includes:
  - the dequantization means which reads the coefficient sequence from the first storage means and executing a dequantization on the coefficient sequence to generate an orthogonal transformation coefficient sequence; and
  - the conversion means;
- second storage means for storing the difference unit image generated by the conversion means;
- third processing means which includes:
  - the first constant generating means;
  - the first image selecting means which selects the first constant image when the difference information indicates that the original unit image is equal to the reference unit image and reads the difference unit image from the second storage means and selects the read difference unit image when the difference information indicates that the original unit image is different from the reference unit image;
  - the image storage means; and
  - the partial restoring means;
- sequential controlling means for executing a pipeline control on the first processing means, the second processing means, and the third processing means; and
- the preventing means which includes:
  - first preventing means for preventing the difference decoding means from generating the one or more pairs of an effectiveness factor and a run length when the extracted difference information indicates that the original unit image is equal to the reference unit image; and
  - second preventing means for, when the extracted difference information indicates that the original image unit is equal to the reference unit image, preventing the dequantization means from executing the dequantization and preventing the conversion means from executing the inverse orthogonal transformation.

18. The image decoding apparatus of claim 17, wherein the image restoring means includes:
- first error detecting means for detecting an out-of-range error which indicates that the coded difference block includes a valve exceeding a predetermined range, the image decoding apparatus further comprises:
- first error controlling means for instructing the image restoring means to stop restoring the coded difference block when the first error detecting means detects the out-of-range error, and the image restoring means further includes:
- error image restoring means for generating a replacement block using a reference block of the reference frame pictures stored in the image storage means and writing the replacement block into the first frame picture stored in the image storage means in place of the coded difference block when an error is detected.

19. The image decoding apparatus of claim 18, wherein the image restoring means further includes:
- second error detecting means for detecting a motion compensation error, wherein the first error controlling means instructs the image restoring means to stop restoring the coded difference block when the second error detecting means detects the motion compensation error.

20. The image decoding apparatus of claim 19, wherein the third processing means further includes:
- frame picture copying means for reading a reference frame picture from the image storage means and writing the read reference frame picture into the image storage means as the first frame picture before restoration of the currently decoded frame picture is started, the partial restoring means includes:
- block restoring means for restoring the original block and writing the restored original block into the first frame picture stored in the image storage means when both the first error detecting means and the second error detecting means fail to detect an error, and the error image restoring means includes:
- image write prohibiting means for prohibiting the block restoring means from writing the restored original block into the first frame picture when either of the first error detecting means and the second error detecting means detects an error.

21. The image decoding apparatus of claim 19, wherein the error image restoring means includes:
  image reading means for reading a block from a reference block of the reference frame pictures stored in the image storage means when either of the first error detecting means and the second error detecting means detects an error, wherein the read block, in terms of positioning in frame picture, corresponds to the coded difference block from which the error is detected; and
  replacement block writing image for writing the block read by the image reading means into the first frame picture stored in the image storage means as the replacement block.

22. The image decoding apparatus of claim 1, wherein
the extracting means extracts a coded block from the coded data, wherein the coded block is the coded unit image, the coded block includes difference information which indicates whether an original block of the coded block is equal to a reference block which is a part of a frame picture having been decoded, and, during a predictive coding process, the original block is transformed into the coded block which includes difference values between pixel values of the original block and pixel values of the reference block when the difference information indicates that the original block is equal to the reference block, wherein the coded block including the difference values is also called a coded difference block, the original block and the reference block each having a same, predetermined number of pixels, a block not having been coded is the original unit image, the reference block is the reference unit image in the frame picture, and the coded difference block is the coded difference unit image,
the difference decoding means decodes (for decoding) the coded difference block to generate a difference block, wherein the difference block is the difference unit image,
the preventing means prevents the difference decoding means from generating the difference block when the extracted difference information indicates that the original block is equal to the reference block,
the first constant generating means generates a first constant image which is composed of constants "0",
the first image selecting means selects the first constant image when the difference information indicates that the original block is equal to the reference block and selecting the difference block when the difference information indicates that the original block is different from the reference block, and
the image restoring means restores the original block by adding a block selected by the first image selecting means to the reference block.

23. The image decoding apparatus of claim 22, wherein
the first constant generating means includes:
  a first constant generating sub-unit for generating one constant "0"; and
  a first constant controlling sub-unit for instructing the first constant generating sub-unit to generate a predetermined number of constants "0" and generating the first constant image being composed of the predetermined number of constants "0."

24. The image decoding apparatus of claim 22, wherein
the first constant generating means generates one constant "0" as the first constant image, and
the first image selecting means selects the constant "0" generated by the first constant generating means as many times as the predetermined number of pixels in the original block when the difference information indicates that the original block is equal to the reference block, and the image restoring means restores the original block by adding the predetermined number of constants "0" selected by the first image selecting means to the reference block when the difference information indicates that the original block is equal to the reference block.

25. The image decoding apparatus of claim 22, wherein
the first constant generating means generates a plurality of constants "0" as the first constant image, and
the first image selecting means selects the plurality of constants "0" generated by the first constant generating means a predetermined number of times so that the same number of constants "0" as the predetermined number of pixels in the original block are selected when the difference information indicates that the block is equal to the reference block, and
the image restoring means restores the original block by adding the constants "0" selected by the first image selecting means to the reference block when the difference information indicates that the block is equal to the reference block.

26. The image decoding apparatus of claim 22, wherein
the difference decoding means includes:
  effectiveness factor generating means for decoding the coded difference block to generate one or more pairs of an effectiveness factor and a run length;
  second constant generating means for generating constants "0," wherein the constants "0" generated by the second constant generating means are called second constants;
  second image selecting means for selecting as many second constants as specified by the run lengths generated by the effectiveness factor generating means and generating a coefficient sequence by combining the selected second constants with the effectiveness factors generated by the effectiveness factor generating means;
  dequantization means for executing a dequantization on the coefficient sequence to generate an orthogonal transformation coefficient sequence; and
  conversion means for executing an inverse orthogonal transformation on the orthogonal transformation coefficient sequence to generate the difference block.

27. The image decoding apparatus of claim 26, wherein
the orthogonal transformation executed by the conversion means is an Inverse Discrete Cosine Transform.

28. The image decoding apparatus of claim 27, wherein
the image restoring means includes:
image storage means for storing one or more reference frame pictures having been decoded and a first frame picture which is a currently decoded frame picture; and
block writing means for reading a reference block from the reference frame pictures stored in the image storage means, restoring the original block by adding the block selected by the first image selecting means to the read reference block, and writing the restored original block into the first frame picture stored in the image storage means.

29. The image decoding apparatus of claim 28, wherein
the image restoring means includes:
  first error detecting means for detecting an out-of-range error which indicates that the coded difference block includes a value exceeding a predetermined range,
the image decoding apparatus further comprises:
  first error controlling means for instructing the image restoring means to stop restoring the coded difference block and instructing the analyzing means to extract a next coded block from the coded data when the first error detecting means detects the out-of-range error, and the image restoring means further includes:

error image restoring means for generating a replacement block using a reference block of the reference frame pictures stored in the image storage means and writing the replacement block into the first frame picture stored in the image storage means in place of the coded difference block when the first error detecting means detects the out of range error.

30. The image decoding apparatus of claim 29, wherein the image restoring means further includes:

second error detecting means for detecting a motion compensation error, the image decoding apparatus further comprises:

second error controlling means for instructing the image restoring means to stop restoring the coded difference block and instructing the analyzing means to extract a next coded block from the coded data when the second error detecting means detects the motion compensation error.

31. The image decoding apparatus of claim 30, wherein the image restoring means further includes:

frame picture copying means for reading a reference frame picture from the image storage means and writing the read reference frame picture into the image storage means as the first frame picture before restoration of the currently decoded frame picture is started, the block writing means includes:

block restoring means for restoring the original block and writing the restored original block into the first frame picture stored in the image storage means when both the first error detecting means and the second error detecting means fail to detect an error, and the error image restoring means includes:

image write prohibiting means for prohibiting the block restoring means from writing the restored original block into the first frame picture when either of the first error detecting means and the second error detecting image detects an error.

32. The image decoding apparatus of claim 30, wherein the error image restoring means includes:

image reading means for reading a block from a reference block of the reference frame pictures stored in the image storage means when either of the first error detecting means and the second error detecting means detects an error, wherein the read block, in terms of positioning in frame picture, corresponds to the coded difference block from which the error is detected; and replacement block writing image for writing the block read by the image reading means into the first frame picture stored in the image storage means as the replacement block.

33. The image decoding apparatus of claim 1, wherein the extracting means extracts a predetermined number of coded blocks from the coded data, wherein the coded block is the coded unit image, the predetermined number of coded blocks includes a pattern identifier corresponding to a pattern, wherein the pattern shows a pattern of difference between a predetermined number of original blocks of the predetermined number of coded blocks and a predetermined number of reference blocks so that which original block is different from a corresponding reference block is recognized, each reference block is a part of a frame picture having been decoded, and, during a predictive coding process, the predetermined number of original blocks are transformed into the predetermined number of coded blocks which each include difference values between pixel values of the each original block and pixel values of a corresponding reference block when the original block is different from the reference block, wherein coded blocks including the difference values are also called coded difference blocks, and each original block and each reference block has a same, predetermined number of pixels, a block not having been coded is the original unit image, the reference block is the reference unit image in the frame picture, and the coded difference block is the coded difference unit image, the difference decoding means decodes each coded difference block including difference values to generate a difference block, wherein the difference block is the difference unit image, the preventing means includes:

a preventive pattern table which includes a plurality of patterns and a plurality of pattern identifiers corresponding to the plurality of patterns;

preventive judging means for judging whether each of the predetermined number of blocks is different from a corresponding reference block by referring to the preventive pattern table to identify the pattern related to the extracted pattern identifier; and preventive control means for preventing the difference decoding means from generating the difference block when the preventive judging means judges that each of the predetermined number of blocks is equal to a corresponding reference block, the first constant generating means generates a first constant image which is composed of constants "0";

the first image selecting means includes:

a pattern table which includes a plurality of patterns and a plurality of pattern identifiers corresponding to the plurality of patterns; and judging means for judging whether each of the predetermined number of original blocks is different from a corresponding reference block by referring to the pattern table to identify the pattern related to the pattern identifier included in the predetermined number of coded blocks;

selecting means for selecting the first constant image for each of the predetermined number of original blocks when the judging means judges that the each original block is equal to a corresponding reference block, and selecting a corresponding difference block when the difference information indicates that the each original block is different from a corresponding reference block, and the image restoring means restores the predetermined number of original blocks by adding a result selected by the first image selecting means to corresponding reference blocks.

34. The image decoding apparatus of claim 33, wherein the first constant generating means generates a third constant image which is composed of as many constants "0" as a number of pixels included in the predetermined number of original blocks, the judging means further judges whether all of the predetermined number of original blocks are equal to the predetermined number of reference blocks from the pattern identifier and the pattern table, the selecting means selects the third constant image generated by the third constant generating means when the judging means judges that all of the predetermined number of original blocks are equal to the predetermined number of reference blocks, the second constant generating means generates as many second constants as the predetermined number of pixels in each original block, and the image restoring means includes:

effectiveness factor generating means for decoding coded difference blocks out of the predetermined number of coded blocks in sequence to generate one or more pairs of an effectiveness factor and a run length for each of the coded difference blocks;

second constant generating means for generating constants "0" called second constants and for generating as many constants "0," which are called fourth constants, as a number of pixels included in each original block, second image selecting means, when the judging means judges that not all of the predetermined number of original blocks are equal to the predetermined number of reference blocks, for selecting the fourth constants generated by the second constant generating means for each original unit block being equal to corresponding reference block to generate a coefficient sequence composed of the selected fourth constants, and selecting as many second constants as specified by the run lengths generated by the effectiveness factor generating means for each original unit block as being different from corresponding reference block to generate a coefficient sequence by combining the selected second constants with the effectiveness factors generated by the effectiveness factor generating means;

dequantization means for executing a dequantization on the coefficient sequence generated by the second image selecting means to generate an orthogonal transformation coefficient sequence; and conversion means for executing an inverse orthogonal transformation on the orthogonal transformation coefficient sequence to generate a difference block.

35. An image decoding apparatus for decoding coded data to generate moving pictures, the image decoding apparatus comprising:

effectiveness factor generating means for extracting a coded unit image from the coded data, decoding the extracted coded unit image to generate one or more pairs of an effectiveness factor and a run length, wherein original unit images making up frame pictures of moving pictures are coded in sequence for each frame picture to turn into coded unit images, each original unit image having a predetermined number of pixels;

first error detecting means for detecting an out-of-range error which indicates that the coded unit image includes a value exceeding a predetermined range, second constant generating means for generating constants "0" when the first error detecting means does not detect the out-of-range error, wherein the constants "0" generated by the second constant generating means are called second constants;

second image selecting means, when the first error detecting means does not detect the out-of-range error, for selecting as many second constants as specified by the run lengths generated by the effectiveness factor generating means and generating a coefficient sequence by combining the selected second constants with the effectiveness factors generated by the effectiveness factor generating means;

dequantization means for executing a dequantization on the coefficient sequence to generate an orthogonal transformation coefficient sequence;

conversion means for executing an inverse orthogonal transformation on the orthogonal transformation coefficient sequence to restore the original unit image, image storage means for storing one or more reference frame pictures having been decoded and a first frame picture which is a currently decoded frame picture;

partial restoring means for reading a reference unit image from the reference frame pictures stored in the image storage means, restoring the original unit image by adding the unit image selected by the first image selecting means to the read reference unit image, and writing the restored original unit image into the first frame picture stored in the image storage means;

first error controlling means for instructing the effectiveness factor generating means to stop decoding the coded unit image and to extract a next coded unit image from the coded data when the first error detecting means detects the out-of-range error; and error image restoring means for generating a replacement unit image using a reference unit image of the reference frame pictures stored in the image storage means and writing the replacement unit image into the first frame picture stored in the image storage means in place or the coded unit image when the first error detecting means detects the out-of-range error.

36. The image decoding apparatus of claim 35 further comprising:

second error detecting means for detecting a motion compensation error; and second error controlling means for instructing the effectiveness factor generating means to stop decoding the coded unit image and to extract a next coded unit image from the coded data when the second error detecting means detects the motion compensation error.

37. The image decoding apparatus of claim 36 further comprising:

frame picture copying means for reading a reference frame picture from the image storage means and writing the read reference frame picture into the image storage means as the first frame picture before restoration of the currently decoded frame picture is started, wherein the partial restoring means includes:

unit image restoring means for restoring the original unit image and writing the restored original unit image into the first frame picture stored in the image storage means when both means fail to detect an error, and the error image restoring means includes:

image write prohibiting means for prohibiting the unit image restoring means from writing the restored original unit image into the first frame picture when either of the first error detecting means and the second error detecting means detects an error.

38. The image decoding apparatus of claim 36, wherein the error image restoring means includes:

image reading means for reading a unit image from a reference unit image of the reference frame pictures stored in the image storage means when either of the first error detecting means and the second error detecting means detects an error, wherein the read unit image, in terms of positioning in frame picture, corresponds to the coded unit image from which the error is detected; and replacement unit image writing image for writing the unit image read by the image reading means into the first frame picture stored in the image storage means as the replacement unit image.

39. An image decoding apparatus for decoding coded data to generate moving pictures, the image decoding apparatus comprising:

effectiveness factor generating means for extracting a coded unit image from the coded data, decoding the extracted coded unit image to generate one or more pairs of an effectiveness factor and a run length, wherein original unit images making up a frame pictures of moving pictures are coded in sequence for each frame picture to turn into coded unit images, each original unit image having a predetermined number of pixels;

second constant generating means for generating constants "0," wherein the constants "0" generated by the second constant generating means are called second constants;

second image selecting means for selecting as many second constants as specified by the run lengths generated by the effectiveness factor generating means and generating a coefficient sequence by combining the selected second constants with the effectiveness factors generated by the effectiveness factor generating means;

dequantization means for executing a dequantization on the coefficient sequence to generate an orthogonal transformation coefficient sequence;

conversion means for executing an inverse orthogonal transformation on the orthogonal transformation coefficient sequence to generate a unit image;

image storage means for storing one or more reference frame pictures having been decoded and a first frame picture which is a currently decoded frame picture;

partial restoring means for reading a reference unit image from the reference frame pictures stored in the image storage means, restoring the original unit image by adding the unit image selected by the first image selecting means to the read reference unit image, and writing the restored original unit image into the first frame picture stored in the image storage means;

second error detecting means for detecting a motion compensation error;

error image restoring means for generating a replacement unit image using a reference unit image or the reference frame pictures stored in the image storage means and writing the replacement unit image into the first frame picture stored in the image storage means in place of the coded unit image when the second error detecting means detects the motion compensation error; and second error controlling means for instructing the effectiveness factor generating means to stop decoding the coded unit image and to extract a next coded unit image from the coded data when the second error detecting means detects the motion compensation error.

40. The image decoding apparatus of claim 39 further comprising:

frame picture copying means for reading a reference frame picture from the image storage means and writing the read reference frame picture into the image storage means as the first frame picture before restoration of the currently decoded frame picture is started, wherein the image restoring means includes:
  unit image restoring means for restoring the original unit image and writing the restored original unit image into the first frame picture stored in the image storage means when the second error detecting means fails to detect an error; and
  image write prohibiting means for prohibiting the error image restoring means from writing the replacement unit image into the first frame picture when the second error detecting means detects an error, the partial restoring means includes:
  unit image restoring means for restoring the original unit image and writing the restored original unit image into the first frame picture stored in the image storage means when both the first error detecting means and the second error detecting means fail to detect an error, and the image restoring means includes:
  image write prohibiting means for prohibiting the error image restoring means from writing the replacement unit image into the first frame picture when either of the first error detecting means and the second error detecting means detects an error.

41. The image decoding apparatus of claim 39, wherein the error image restoring means includes:

image reading means for reading a unit image from a reference unit image of the reference frame pictures stored in the image storage means when the second error detecting means detects an error, wherein the read unit image, in terms of positioning in frame picture, corresponds to the coded difference unit image from which the error is detected; and replacement unit image writing image for writing the unit image read by the image reading means into the first frame picture stored in the image storage means as the replacement unit image.

* * * * *